US009807402B2

(12) United States Patent
Lin et al.

(10) Patent No.: US 9,807,402 B2
(45) Date of Patent: Oct. 31, 2017

(54) METHOD OF COLOR PALETTE CODING APPLICABLE TO ELECTRONIC DEVICE AND ELECTRONIC DEVICE USING THE SAME

(71) Applicant: Industrial Technology Research Institute, Hsinchu (TW)

(72) Inventors: Ching-Chieh Lin, Taipei (TW); Chun-Lung Lin, Yunlin County (TW); Yao-Jen Chang, Hsinchu (TW); Jih-Sheng Tu, Yilan County (TW)

(73) Assignee: Industrial Technology Research Institute, Hsinchu (TW)

( * ) Notice: Subject to any disclaimer, the term of this patent is extended or adjusted under 35 U.S.C. 154(b) by 15 days.

(21) Appl. No.: 14/875,697

(22) Filed: Oct. 6, 2015

(65) Prior Publication Data
US 2016/0100178 A1    Apr. 7, 2016

Related U.S. Application Data

(60) Provisional application No. 62/060,015, filed on Oct. 6, 2014.

(51) Int. Cl.
*H04N 19/186*    (2014.01)
*H04N 1/64*    (2006.01)
(Continued)

(52) U.S. Cl.
CPC ........... *H04N 19/186* (2014.11); *H04N 1/644* (2013.01); *H04N 19/70* (2014.11); *H04N 19/90* (2014.11)

(58) Field of Classification Search
CPC ........ G06F 8/30; H04N 19/186; H04N 19/70; H04N 1/644; H04N 19/90; H04N 19/93
See application file for complete search history.

(56) References Cited

U.S. PATENT DOCUMENTS 5,502,458 A * 3/1996 Braudaway ............... G09G 5/06
  345/1.1
5,659,631 A * 8/1997 Gormish ................ H04N 1/644
  375/E7.265

(Continued)

OTHER PUBLICATIONS

Chen et al., "Description of screen content coding technology proposal by Qualcomm," 17th Joint Collaborative Team on Video Coding meeting, Mar. 18, 2014, pp. 1-18.
"Office Action of Europe Counterpart Application", dated Mar. 3, 2016, p. 1-p. 13.
Xiaoyu Xiu, et al., "Description of screen content coding technology proposal by InterDigital," JCTVC-Q0037, Joint Collaborative Team on Video Coding (JCT-VC) of ITU-T SG16 WP3 and ISO/IEC JTC1/SC29/WG11, 17th Meeting: Valencia, ES, Mar. 27-Apr. 4, 2014, pp. 1-30.

(Continued)

*Primary Examiner* — Jingge Wu
(74) *Attorney, Agent, or Firm* — JCIPRNET

(57) ABSTRACT

The disclosure is directed to a method of color palette coding and an electronic device using the same method. The proposed method would include not limited to encoding, by using a processor, a bit stream to represent a color of a coding unit and storing the bit stream in a storage medium or transmitting the bit stream. The bit stream would include not limited to a binary bit representing a run flag, a N binary bit sequence representing up to $2^N$ major colors in a coding unit with each of the possible values of the N binary bit sequence representing an unique major color index of N major color indices, and a M binary bit sequence representing up to $2^M$ extended colors with each of the possible values of the M binary bit sequence representing an unique extended color index of M extended color indices.

13 Claims, 19 Drawing Sheets

(51) Int. Cl.
*H04N 19/70* (2014.01)
*H04N 19/90* (2014.01)

(56) References Cited

U.S. PATENT DOCUMENTS

| | | | |
|---|---|---|---|
| 5,727,090 A | 3/1998 | Yellin | |
| 7,016,547 B1 | 3/2006 | Smirnov | |
| 2002/0016772 A1* | 2/2002 | Shane | G06Q 20/105 705/43 |
| 2004/0179731 A1* | 9/2004 | Ono | H04N 1/644 382/166 |
| 2004/0252899 A1* | 12/2004 | Wang | H03M 7/4006 382/239 |
| 2005/0152605 A1* | 7/2005 | Hoogendijk | H04N 1/644 382/232 |
| 2006/0167692 A1 | 7/2006 | Basu et al. | |
| 2006/0204086 A1* | 9/2006 | Gargi | H04N 1/644 382/166 |
| 2007/0071339 A1* | 3/2007 | Yang | H04N 1/64 382/240 |
| 2007/0116370 A1* | 5/2007 | Smirnov | H03M 7/40 382/245 |
| 2007/0269104 A1* | 11/2007 | Whitehead | G06T 5/008 382/162 |
| 2015/0016501 A1 | 1/2015 | Guo et al. | |
| 2015/0181223 A1 | 6/2015 | Gisquet et al. | |
| 2015/0189319 A1 | 7/2015 | Pu et al. | |

OTHER PUBLICATIONS

Zhaotai Pan, et al. "A Low-Complexity Screen Compression Scheme," 2012 IEEE Visual Communications and Image Processing (VCIP), Nov. 27-30, 2012, pp. 1-6.

Zhaotai Pan, et al. "A Low-Complexity Screen Compression Scheme for Interactive Screen Sharing," IEEE Transactions on Circuits and Systems for Video Technology, vol. 23, No. 6, Jun. 2013, pp. 949-960.

Victor Buttigieg, et al, "Using Variable-Length Error-Correcting Codes in MPEG-4 Video," International Symposium on Information Theory, 2005. ISIT 2005. Proceedings. Sep. 4-9, 2005, pp. 2379-2383.

Wei Pu, et al., "AHG10: Suggested Software for Palette Coding based on RExt6.0," JCTVC-Q0094, Joint Collaborative Team on Video Coding (JCT-VC) of ITU-T SG16 WP3 and ISO/IEC JTC1/SC29/WG11, 17th Meeting: Valencia, ES, Mar. 27-Apr. 4, 2014, pp. 1-4.

Huifeng Shen, et al., "A High-Performance Remote Computing Platform," IEEE International Conference on Pervasive Computing and Communications, 2009. PerCom 2009. Mar. 9-13, 2009, pp. 1-6.

Chia-Ming Tsai, et al., "SCCE3: Test B.11—Escape color prediction," JCTVC-R0170, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-4.

* cited by examiner

FIG. 7

Table 702 (M=22):

| Color | Major Color index# (5bit) |
|---|---|
| NG | 0 |
| Gr | 1 |
|  | 2 |
|  | 3 |
|  | 4 |
| ... | ... |
| Y | 21 |

+

Table 701 (M=8):

| Color | Major Color index# (5bit) |
|---|---|
| 0 | 0 |
| B | 1 |
| NB | 2 |
| W | 3 |
| Br | 4 |
| G | 5 |
| BK | 6 |
| R | 7 |

=

Table 700 (M=30):

| Color | Major Color index# (5bit) |
|---|---|
| 0 | 0 |
| B | 1 |
| NB | 2 |
| W | 3 |
| Br | 4 |
| G | 5 |
| BK | 6 |
| R | 7 |
| P | 8 |
| NG | 9 |
| Gr | 10 |
| ... | ... |
| Y | 29 |

Syntax : copy run mode flag+pixel level alternative escape flag(1)
+extended color index #7 + original color value 1001 — e.g. '0' + '1' + '000'

| 0 | 0 | 0 | (E1) Gr | 0 | 0 | 0 | (E1) Gr |
|---|---|---|---|---|---|---|---|
| NB | NB | NB | NB | NB | NB | 0 | 0 |
| NB | NB | NB | NB | NB | NB | 0 | (E2) LG |
| 0 | 0 | M | M | M | 0 | 0 | B |
| 0 | (E3) P | 0 | B | B | B | (E4) Y | B |
| B | B | (E2) LG | B | B | B | 0 | B |
| B | B | 0 | 0 | (E4) Y | 0 | B | B |
| 0 | (E3) P | Br | Br | Br | Br | Br | (E5) NG |

...

| 0 | 0 | 0 | Gr^ON | 0 | 0 | 0 | Gr^ON |
|---|---|---|---|---|---|---|---|
| NB | NB | NB | NB | NB | NB | 0 | 0 |
| NB | NB | NB | NB | NB | NB | 0 | LG^ON |
| 0 | 0 | M | M | M | 0 | 0 | B |
| 0 | P^ON | 0 | B | B | B | Y^ON | B |
| B | B | LG^ON | B | B | B | 0 | B |
| B | B | 0 | 0 | Y^ON | 0 | B | B |
| 0 | P^ON | Br | Br | Br | Br | Br | NG^ON |

...

1002
e.g. '0' + '1' + '111'
+ '10010010 11010000 1010000'

Major color table

| Color | Major Color index# (5bit) |
|---|---|
| 0 | 0 |
| B | 1 |
| NB | 2 |
| W | 3 |
| Br | 4 |
| ⋮ | ⋮ |
| Extend | 31 |

Extended color table

| Color | Major Color index# (5bit) |
|---|---|
| Gr | 0 |
| LG | 1 |
|  | 2 |
|  | 3 |
| ⋮ | ⋮ |
| Escape | 7 |

Extended color table

| Color | Major Color index# (5bit) |
|---|---|
| Gr | 0 |
| LG | 1 |
|  | 2 |
|  | 3 |
|  | 4 |
| ... | ... |
| .. | 7 |

Major color table

| Color | Major Color index# (5bit) |
|---|---|
| O | 0 |
| B | 1 |
| NB | 2 |
| W | 3 |
| Br | 4 |
| ... | ... |
| .. | 31 | e.g. '1' + '10' + '000'

1211

| (E1) Gr | O | (E2) LG | B | B | B | B | (E5) NG |
|---|---|---|---|---|---|---|---|
| O | O | O | O | (E4) Y | O | B | Br |
| O | NB | NB | O | B | B | O | Br |
| O | NB | NB | M | B | B | (E4) Y | Br |
| (E1) Gr | NB | NB | M | B | B | O | Br |
| O | NB | NB | M | O | (E2) LG | O | Br |
| O | NB | NB | O | (E3) P | B | B | (E3) P |
| O | NB | NB | O | O | B | B | O |

1212 e.g. '1' + '11' + '1111111 1111111 1111111'

FIG. 18 tion is hereby incorporated by reference herein and made a part of specification.

METHOD OF COLOR PALETTE CODING APPLICABLE TO ELECTRONIC DEVICE AND ELECTRONIC DEVICE USING THE SAME

CROSS REFERENCE TO RELATED APPLICATION

This application claims the priority benefit of U.S. provisional application Ser. No. 62/060,015, filed on Oct. 6, 2014. The entirety of the above-mentioned patent application is hereby incorporated by reference herein and made a part of specification.

TECHNICAL FIELD

The present disclosure is directed to a method of color palette coding applicable to an electronic device and an electronic device using the same method.

BACKGROUND

Screen contents of videos may contain sharp edges of the objects, background with simple colors, many texts, fonts, and thin lines. Screen contents of videos that are artificially generated or have been processed could be quite different in characteristics relative to contents of videos which are naturally captured by a camera as such videos may contains rich colors and complex shapes. Consequently, palette coding was proposed to encode and decode screen contents efficiently. A major color table with a limited and fixed size as well as a coded index map could be signaled to a decoder. When the quantization parameter (QP) is high or is under a low bit rate coding condition, the major color table would usually contain all the colors in a current coding unit (CU).

The major color table could be generated and signaled as a dictionary, a code book or a look up table for reference. The major color table may be includes all colors in the current CU. Since there is a limitation for the size of the major color table, colors not selected into the major color table will be represented by escape colors. Colors that are not covered by the major color table would be signaled as escape colors.

In a conventional palette coding scheme, an escape color pixel could be signaled with a mode flag plus a last index in major color table along with 24 bits YUV/RGB color sample values. However, the limited and fixed size of major color table doesn't always work well when the QP is low for high quality coding and lossless coding. In general, when low QP value or lossless coding is implemented, the occurrence of escape colors would be quite high. However, if escape colors would appear many times in a CU, the frequent occurrences of escape colors could make the current signaling scheme very inefficient. The technical details of the aforementioned predicament are further illustrated in FIG. 1 and FIG. 2 and explained in their corresponding written descriptions.

FIG. 1 illustrates a general method color palette coding by using a three index coding mode. In step S101, pixels of a coding block 101 would be analyzed in terms of various colors and the probabilities of their occurrences. In detail, FIG. 1 shows a color sample which includes not limited to 16 pixels, and the colors represented are red (R), pink (Pk), blue (B), light blue (LB), green (G), yellow (Y), and black (Bk). The occurrences of these colors are compiled in a manner similar to a histogram 102. In the example of FIG. 1, the occurrences for R, P, B, LB, G, Y, and BK are 4, 3, 3, 2, 2, 1, and 1 respectively.

In step S102, quantization would be performed to translate from the histogram into a major color index table 103 based on the order of the probability of their occurrences. Afterwards, the color of a pixel would subsequently be referred to by its index. In the example of FIG. 1, index number 0 would refer to the color red (R), index number 1 would refer to the color blue (B), index number 2 would refer to the color green (G), and so forth. In step S103, the colors of each pixel of the color sample 101 would be represented by an index map 104 which could be stored temporarily in a video buffer, saved permanently in a disk drive, or transmitted to a video driver to be shown in a video display.

FIG. 2 illustrates a general method color palette coding by using a three index coding mode through an encoded syntax. In order to encode the colors of a color sample 101, a syntax would be use to represent the colors of the color sample 101. In the sample of FIG. 2, the syntax may include not limited to a copy run mode flag (e.g., 210), a major color index (e.g., 211), and optionally an original color value (e.g., 212) only if the color to be represented is an escape color which is not one of the colors listed in the major color table 220. For example, assuming that the major color table is 5 bits, if the color of a pixel is orange (O), it would be index 0 of the major color table 220 represented by the binary sequence of '00000'; if the color of a pixel is blue (B), it would be indexed as 1 represented by the binary sequence of '00001'; and so forth.

The steps of palate coding of FIG. 2 would be implemented as follows. In step S200, the copy left run mode or the copy above run mode would be determined according to the binary value of the copy run mode flag 210. In step S202, assuming that the copy above run mode is to be implemented, then the copy run mode flag 210 would be set accordingly with an associated run value. Otherwise, in step S201, assuming that the copy left run mode is to be implemented, then copy run mode flag 210 would set as a copy left run mode. The syntax would then include not limited to a major color index with an associated run value if the color to be represented can be exactly represented by the major color table 220. In other words, the color to be represented exactly matches one of the colors of the major color table 220; otherwise, if the color cannot be accurately represented by the major color table 200, the color would be represented as an escape color. In step S203, assuming that the color is an escape color, the syntax would include not limited to the (last) index 211 of the major color table 220 (e.g., the color "escape" of index 31) and an original color value 212. In the same of FIG. 2, assuming that E1 is the color grey which is an escape color, the syntax would include not limited to the copy run mode flag 210 set as '0', the major color index 211 set as the value 31 or '11111', the original color value 212 could be set as '1111111 1111111 1111111' as an example. However, the disclosure does not limit the representation of an original color to be 24 bits nor the exact binary sequences.

If a high resolution color sample is to be encoded, many color samples would be slightly different from the major colors especially for high rate coding conditions such that many color samples could not be accurately represented. If many escape color pixels have to occur more than once in a color sample, it can be seen from FIG. 1 and FIG. 2 that a coding syntax cannot be efficiently encoded, since the length of a binary sequence to represent an original color value 212 is much longer than the length of a binary sequence to represent a major color index. Therefore, an alternative method of color palette coding and an electronic device using the same method from the currently established method could be proposed.

SUMMARY OF THE DISCLOSURE

Accordingly, the disclosure is directed to a method of color palette coding applicable to an electronic device and an electronic device using the same method.

In one of the exemplary embodiments, the present disclosure is directed to a method of color palette coding applicable to an electronic device, the method would include not limited to: encoding, by using a processor, a bit stream to represent a color of a coding unit and storing the bit stream in a storage medium or transmitting the bit stream. The bit stream would include not limited to a binary bit representing a run flag, a N binary bit sequence representing up to $2^N$ major colors in a coding unit with each of the possible values of the N binary bit sequence representing an unique major color index of N major color indices, and a M binary bit sequence representing up to $2^M$ extended colors which are not the major colors and appears less frequently than the major colors in the coding unit with each of the possible values of the M binary bit sequence representing an unique extended color index of M extended color indices.

In one of the exemplary embodiment, the present disclosure is directed to an electronic device which includes not limited to a storage medium and a processor coupled to the storage medium. The processor is configured at least for: encoding a bit stream to represent a color and storing the bit stream in the storage medium or transmitting the bit stream. The bit stream would include not limited to a binary bit representing a run flag, a N binary bit sequence representing up to $2^N$ major colors in a coding unit with each of the possible values of the N binary bit sequence representing an unique major color index of N major color indices, and a M binary bit sequence representing up to $2^M$ extended colors which are not the major colors and appears less frequently than the major colors in the coding unit with each of the possible values of the M binary bit sequence representing an unique extended color index of M extended color indices.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7 illustrates splitting a major color table into multiple major color tables in accordance with one of the exemplary embodiments of the disclosure.

FIG. 10 illustrates implementing pixel level alternative escape flag in accordance with a third exemplary embodiment of the disclosure.

FIG. 12B illustrates an example of operating with pixel level alternative escape flag in accordance with a fourth exemplary embodiment of the disclosure.

FIG. 18 illustrates escape color pixel prediction in accordance with the eighth exemplary embodiment of the disclosure.

DETAILED DESCRIPTION OF DISCLOSED EMBODIMENTS

Figure 1:
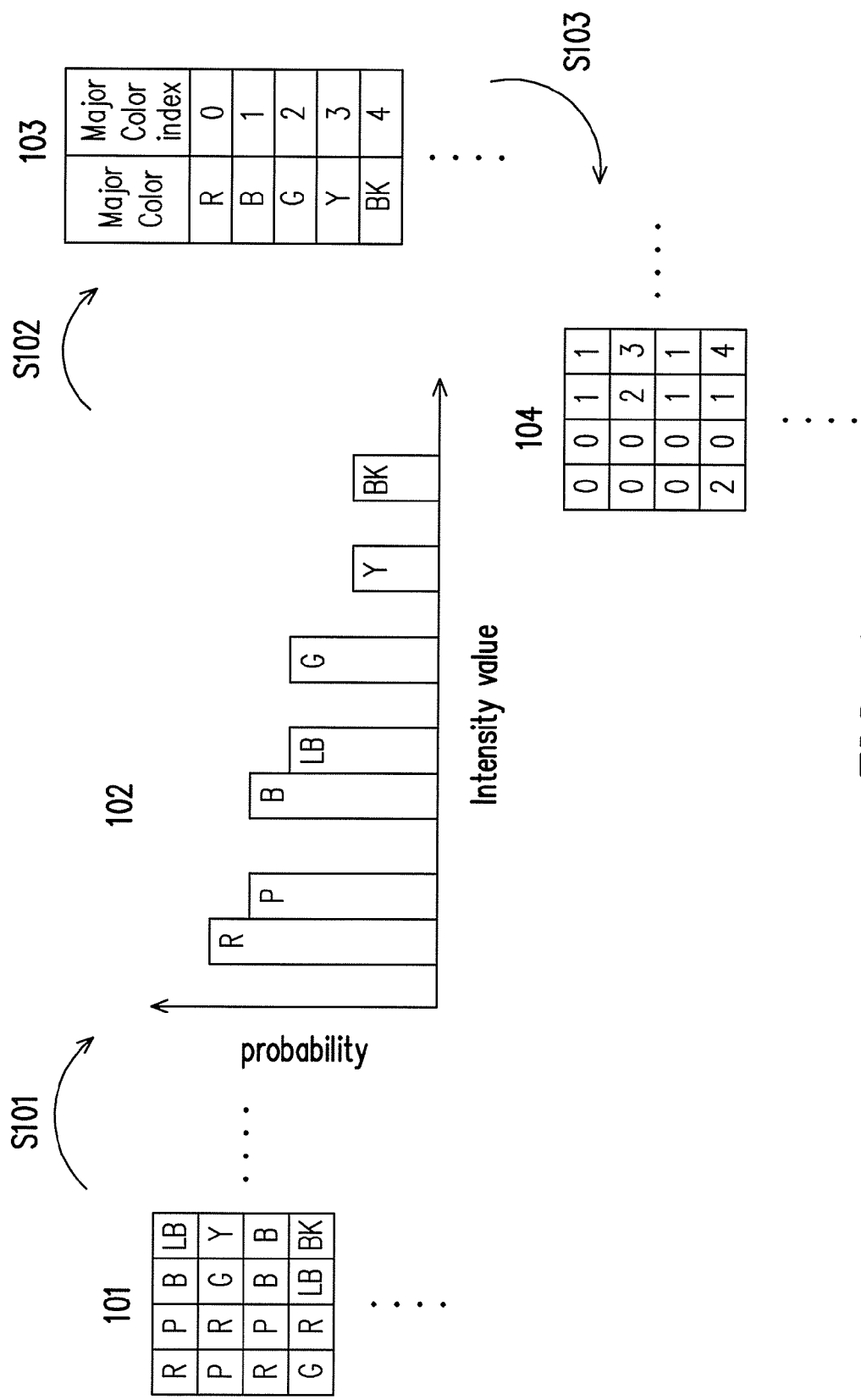
FIG. 1 illustrates a general method color palette coding by using a three index coding mode.
Figure 2:
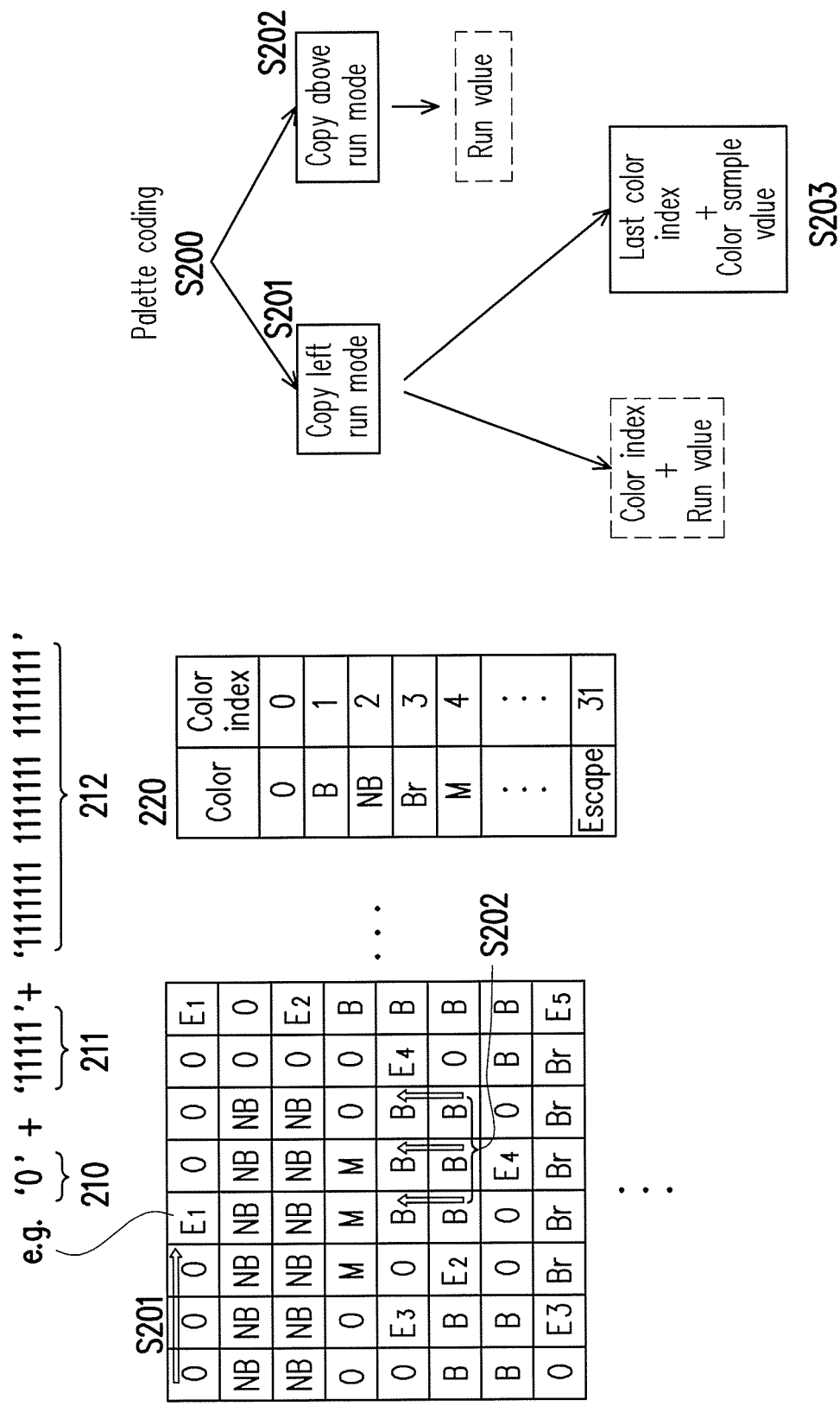
FIG. 2 illustrates a general method color palette coding by using a three index coding mode through an encoded syntax.

Reference will now be made in detail to the present exemplary embodiments of the disclosure, examples of which are illustrated in the accompanying drawings. Wherever possible, the same reference numbers are used in the drawings and the description to refer to the same or like parts.

With the rapid advancements of new technologies in networking, communication systems, electronic display, and digital computers, many applications may require a more efficient coding solution. This proposal discloses a method of color palette coding applicable to an electronic device and an electronic device using the same method to further enhance the coding efficiency of a coding block or a coding unit which could be a part of or a complete digital image. The proposed method and device of the disclosure would reconstruct colors in a coding block according to different color tables for a screen content. Compared with the start of the art, the SCM (screen content test model) anchor with full frame IBC search range, the proposed method may at best achieve the total bit saving rate saving up to 1.0% as test conditions would exclude categories of animations and naturally captured images. A sample of an experimental test result is shown at a table below:

| | Bit-rate saving (Total) | Bit-rate saving (Average) | Bit-rate saving (Min) | Bit-rate saving (Max) |
|---|---|---|---|---|
| RGB, text & graphics with motion, 1080p | 1.0% | 1.0% | 0.3% | 1.3% |
| RGB, text & graphics with motion, 720p | 0.2% | 0.1% | 0.0% | 0.4% |
| RGB, mixed content, 1440p | 0.1% | 0.2% | 0.0% | 0.3% |
| RGB, mixed content, 1080p | 0.1% | 0.1% | 0.1% | 0.1% |
| RGB, Animation, 720p | 0.0% | 0.0% | 0.0% | 0.0% |
| RGB, camera captured, 1080p | 0.0% | 0.0% | 0.0% | 0.0% |
| YUV, text & graphics with motion, 1080p | 0.8% | 0.8% | 0.2% | 1.6% |
| YUV, text & graphics with motion, 720p | 0.1% | 0.1% | 0.0% | 0.2% |
| YUV, mixed content, 1440p | 0.1% | 0.1% | 0.0% | 0.3% |
| YUV, mixed content, 1080p | 0.1% | 0.1% | 0.1% | 0.1% |
| YUV, Animation, 720p | 0.0% | 0.0% | 0.0% | 0.0% |
| YUV, camera captured, 1080p | 0.0% | 0.0% | 0.0% | 0.0% |
| Enc Time[%] | | 103% | | |
| Dec Time[%] | | 100% | | |

For high quality videos, and large coding blocks may contain many color samples which could be slightly different from the major colors and thus the major color table might need to be expanded. For example, to accurately represent 256 colors, 8 bits are required. However, this would mean an increase of the size of a code word. Moreover, because not all colors would appear in a similar frequency, extending the size of a major color table may result in inefficiency of a color palette coding scheme. To enhance the efficiency of a current color palette scheme as the result of increasing video quality, multiple color tables could be implemented.

Figure 3:
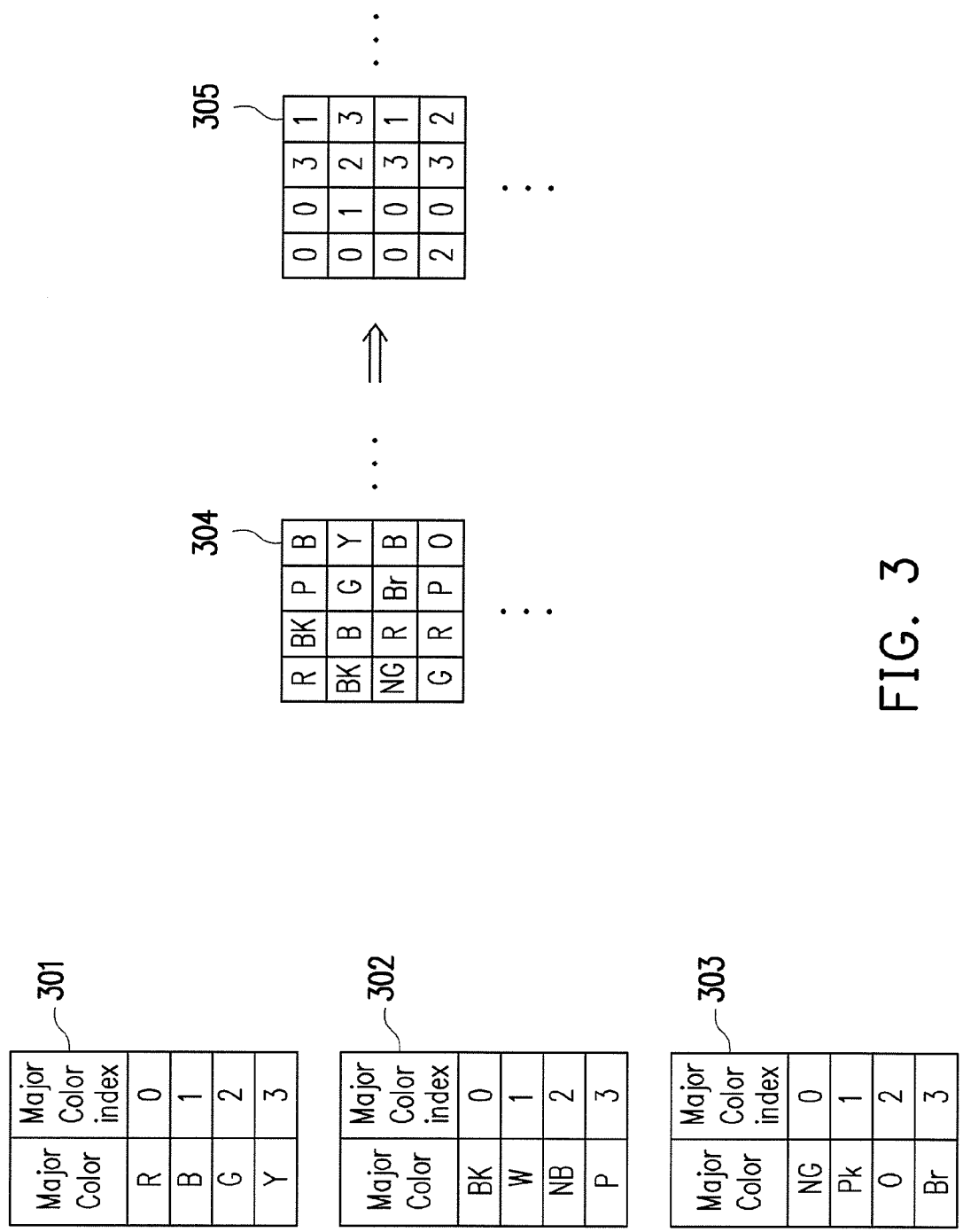
FIG. 3 is an example to illustrate a concept of palette coding by using multiple color tables in accordance with the disclosure.

FIG. 3 is an example to illustrate a concept of palette coding by using multiple color tables in accordance with the disclosure. According to the conceptual diagram of FIG. 3, multiple color tables 301 302 303 could be utilized. For example, for the color table 301, the colors red (R), blue (B), green (G), and yellow (Y) respectively correspond to index 0, 1, 2, and 3 of the color table 301; for the color table 302, the colors black (Bk), white (W), navel blue (NB), and purple (P) respectively correspond to index 0, 1, 2, and 3 of the color table 302; and for the color table 303, the color neon green (NG), pink (Pk), orange (O), and brown (Br) respectively correspond to index 0, 1, 2, and 3 of the color table 303. By using the color tables 301 302 303, a coding block 304 could be represented by a color index map 305. For example, the color upper left corner of the coding block is red which corresponds to the index 0 of the color table 301; the color lower right corner of the coding block is orange which corresponds to index 2 of the color table 303; and so forth. However, a mechanism is required in a code word syntax to distinguish among various color tables being use, and such mechanism would be proposed as a part of the disclosure.

Figure 4:
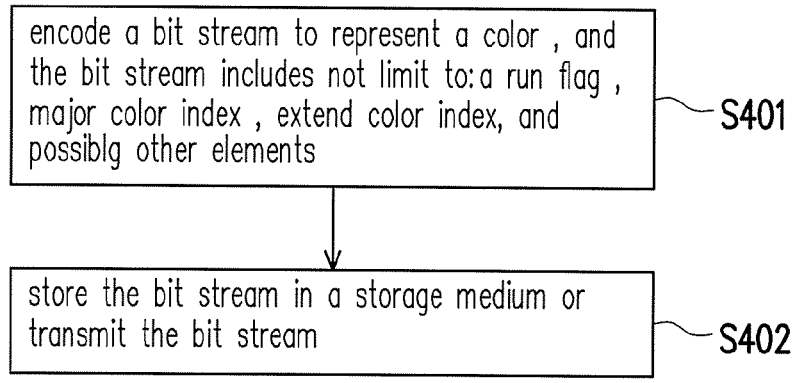
FIG. 4 illustrates a proposed method of color palette coding applicable to an electronic device in accordance with the disclosure.

FIG. 4 illustrates a proposed method of color palette coding applicable to an electronic device in accordance with the disclosure. In step S401, an electronic device would encode, by using a processing unit or a processor, a bit stream to represent a color of a coding unit. In step S402, the bit stream could be stored in a temporary buffer or a permanent storage medium or transmitted to a video driver to be displayed. The bit stream may include a binary bit representing a run flag, a N binary bit sequence representing up to 2 to the Nth major colors in a coding unit with each of the possible values of the N binary bit sequence representing an unique major color index of N major color indices, and a M binary bit sequence representing up to 2 to the Mth extended colors which are not the major colors and appears less frequently than the major colors in the coding unit with each of the possible values of the M binary bit sequence representing an unique extended color index of M extended color indices.

Alternative to the embodiment of FIG. 4, each color of the N major color indices and each color of the M extended color indices could be further coded into variable length representation. For example, a first color of the N major color indices which could be orange could be represented by 2 bits while a second color of the N major color indices which could be blue could be represented by 3 bits and so forth. The same example may apply for the extended color indices. For example, each color of the N major color indices and each color of the M extended color indices would be represented by unique values of a binary sequence such as according to Hoffman codes.

In one of the exemplary embodiments, an index of the N major color indices would be used to refer to not a particular major color but to another set of color table such as the aforementioned extended colors.

In one of the exemplary embodiments, an index of the M extended color indices would be used to refer to not a particular extended color nor a major color but an escape color. The bit stream may further include an escape color bit sequence representing the escape color in the case only if a color to be represented is not a major color not an extended color but a major color. The escape color bit sequence would likely be longer than both the N binary bit sequence and the M binary bit sequence. The major color bit sequence could be represented by an original color value of the escape color.

In one of the exemplary embodiments, the run flag is at least one bit that indicates either a copy left mode or a copy above mode.

In one of the exemplary embodiments, the last of the N major color indices refers to the extended colors. Similarly, the last of the M extended color indices refers to the escape color.

In one of the exemplary embodiments, an index of the M extended color indices may refer to a second set of extended colors which are neither the major colors nor the extended colors.

In one of the exemplary embodiments, another bit stream may include a pixel level alternative escape flag, a second M binary bit sequence representing up to 2 to the (M-1)th extended colors, and a second original color value to represent an escape color of the second coding unit.

In one of the exemplary embodiments, when the pixel level alternative escape flag is a first value, the color of the second coding unit is represented by the M extended color indices, and when the pixel level alternative escape flag is a second value, the color of the second coding unit is represented by the N major color indices.

In one of the exemplary embodiments, only when the run flag indicates the copy above mode, the pixel level alternative escape flag is the first value.

In one of the exemplary embodiments, a third bit stream may include a third binary bit indicating the copy above mode, a pixel level alternative escape flag set to the second value, and a third original color value to represent the third escape color.

In one of the exemplary embodiments, if the color of the third coding unit is not the third escape color, the third binary bit in the third bit stream may indicate the copy above mode; the pixel level alternative escape flag set to the first value in the third bit stream; and a copy above run value associated with the copy above mode may also be provided.

In one of the exemplary embodiments, a fourth bit stream could represent a color of a fourth coding unit. If the fourth color is a fourth escape color, the fourth bit stream may include a fourth binary bit representing a run flag which indicates the copy above mode, a run value associated with the run flag, and a fourth original color value to represent the fourth escape color. If the color of the fourth coding unit is not the fourth escape color, the fourth bit stream may otherwise include the fourth binary bit representing the run flag which indicates the copy above mode, the run value associated with the run flag, and a second M binary bit sequence representing up to 2 to the Mth extended colors.

In one of the exemplary embodiments, a fifth bit stream could be used to represent a color of a fifth coding unit, and the fifth bit stream may include not limited to a pixel level alternative escape flag. If the pixel level alternative escape flag is set as the second value, the fifth bit stream may further include a third N binary bit sequence representing up to 2 to the Nth major colors in a coding unit with each of the possible values of the N binary bit sequence representing an unique major color index of N major color indices except for a last index indicating an escape color.

In one of the exemplary embodiments, if the pixel level alternative escape flag is set as the second value, the last index indicates one of the major colors, but if the pixel level alternative escape flag is set as active, the last index refers to one of the extended colors.

Figure 5:
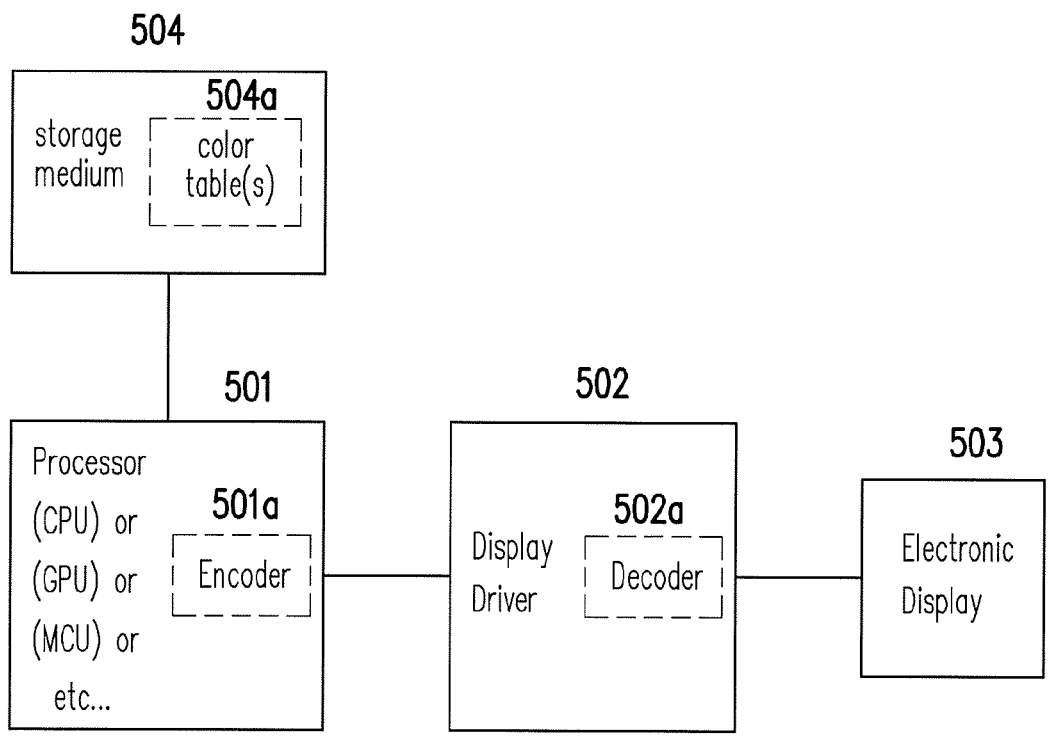
FIG. 5 illustrates an exemplary electronic device which uses the proposed method of color palette coding applicable to an electronic device in accordance with the disclosure.

FIG. 5 illustrates an exemplary electronic device which uses the proposed method of color palette coding applicable to an electronic device in accordance with the disclosure. The exemplary electronic device may include not limited to a processing unit 501, a storage medium 504, optionally a display driver 502, and optionally an electronic display 503. The processing unit 502 is electrically coupled to the storage medium 504, the display driver 502, and the electronic display 503. The storage medium 504 may could be a temporarily storage buffer or a permanent storage or a combination of both. The storage medium 504 may be a fixed or a movable device in any possible forms including non-transitory computer readable recording medium such as a random access memory (RAM), a read-only memory (ROM), a flash memory or other similar devices, or a combination of the above-mentioned devices. The processing unit 501 is configured to process digital signals and to perform procedures of the proposed method of color palette coding as described in the disclosure. The storage medium 504 may store software programs used by the processing unit 501 as such as the above mentioned images containing coding blocks or image samples for coding, various color tables 504a, color index maps, and so forth.

The processing unit 501 could be a form of a processor or a controller implemented by using programmable units such as a micro-processor, a micro-controller, digital signal processor (DSP) chips, a field-programmable gate array (FPGA), etc. The function of the processing unit 501 may also be implemented with separate electronic devices or ICs, and functions performed by the processing unit 501 may also be implemented within the domains of either hardware or software. The processing unit may contain a hardware or software encoder 501a to encode an image according to the proposed method of color palette coding into a plurality of bit streams which would could either be saved into the storage medium 504 or transmitted to a display driver 502 for display. Upon receiving the bit streams, the display driver may contain a hardware or a software decoder 502a to decode the bit streams in order to display decoded images in an electronic display 503. The display driver 502 may access a storage medium which could be either the storage medium 504 or a local storage medium (not shown) to store software programs used by the display driver 502 as such as the above mentioned images containing coding blocks or image samples for coding, various color tables 504a, color index maps, and so forth.

FIG. 6~FIG. 18 and their corresponding written descriptions serve to elucidate various exemplary embodiments in accordance with the proposed method of color palette coding applicable to an electronic device and an electronic device using the same method.

Figure 6:
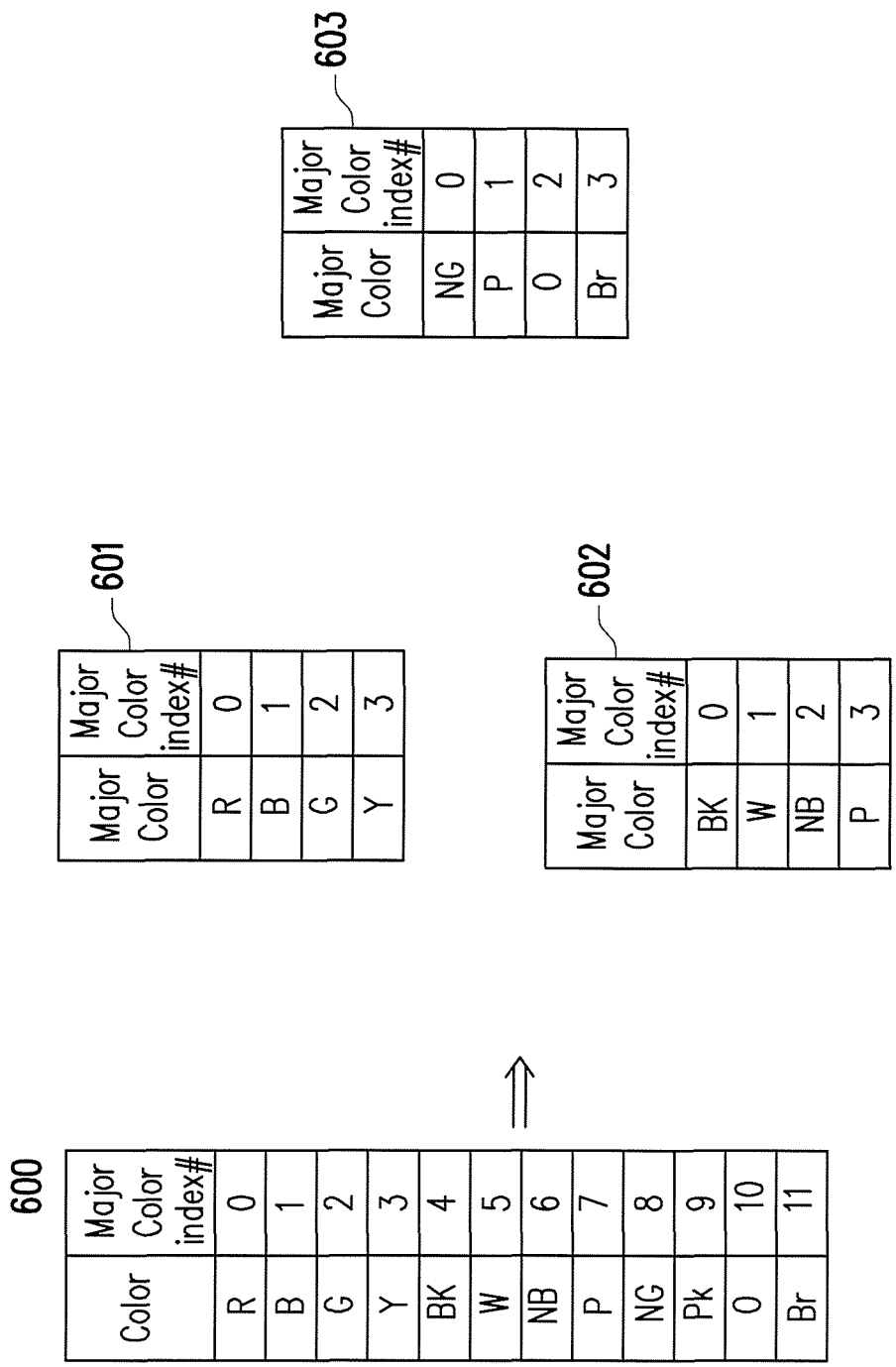
FIG. 6 illustrates an embodiment of generating multiple major color tables in accordance with a first exemplary embodiment of the disclosure.

FIG. 6 illustrates an embodiment of generating multiple major color tables in accordance with a first exemplary embodiment of the disclosure. For the scenario of FIG. 6, a major color table 600 containing 12 colors, namely, red (R), blue (B), green (G), yellow (Y), black (B), white (W), navy blue (NB), purple (P), neon green (NG) pink (Pk), orange (O), and brown (Br) could be splitted into multiple color tables 601 602 603. For example, the color table 601 may contain colors that occur the most frequently than colors of the color tables 602 and 603. The color tables 602 and 603 could be extended color tables with the colors in the color table 602 occurring more frequently than the colors in the color table 603.

An algorithm that can be used to split a color table into multiple color tables could be accomplished by Rate-Distortion optimization check (RDO check). RDO is a check mechanism used for improving video quality in video compression. It optimizes by acting as a video quality metric, measuring both the deviation from the source material and the bit cost for each possible decision outcome. By optimizing the amount of distortion or loss of video quality against the amount of data required to encode the video, the exactly split could be determined. The bits could be mathematically measured by multiplying the bit cost by the Lagrangian, a value representing the relationship between bit cost and quality for a particular quality level. Various deviations could be measured by mean squared error in order to maximize a video quality.

The size of each table could be decided by an encoder that perform RDO checks. The encoder may need to consider additional N RDO checks (e.g., {M−1, M−2, M−3, . . . , M−N} RDO checks) with various palette sizes in order to get the best size S. In this way, at least two tables could be obtained with one table equal size S and the other equal size M−S. An example of the result of splitting a major color table into multiple color tables is shown in FIG. 7.

FIG. 7 illustrates splitting a major color table into a major color table and an extended color table in accordance with the first exemplary embodiments of the disclosure. One technique that can be deployed is to first find a nearest number of a $n^{th}$ power for M, note that this number may be smaller than M, and then let the size of the first table equal to $2^{n-1}$. In the example of FIG. 7, M=30 as there are 30 colors represented in the major color table 700. For the nearest number of $n^{th}$ power for 30, n would equal to 4. The size of the first table 701 would then equal to $2^{4-1}$ which would equal to 8. Since the size of the first table 701 is 8 which would include all the major colors, the size of the extended table 702 would equal to 30−8=22. Therefore, the first color table 701 would cover eight major colors indexed from 0~7, and the second color table 702 would cover 22 colors indexed from 0~21.

Figure 8:
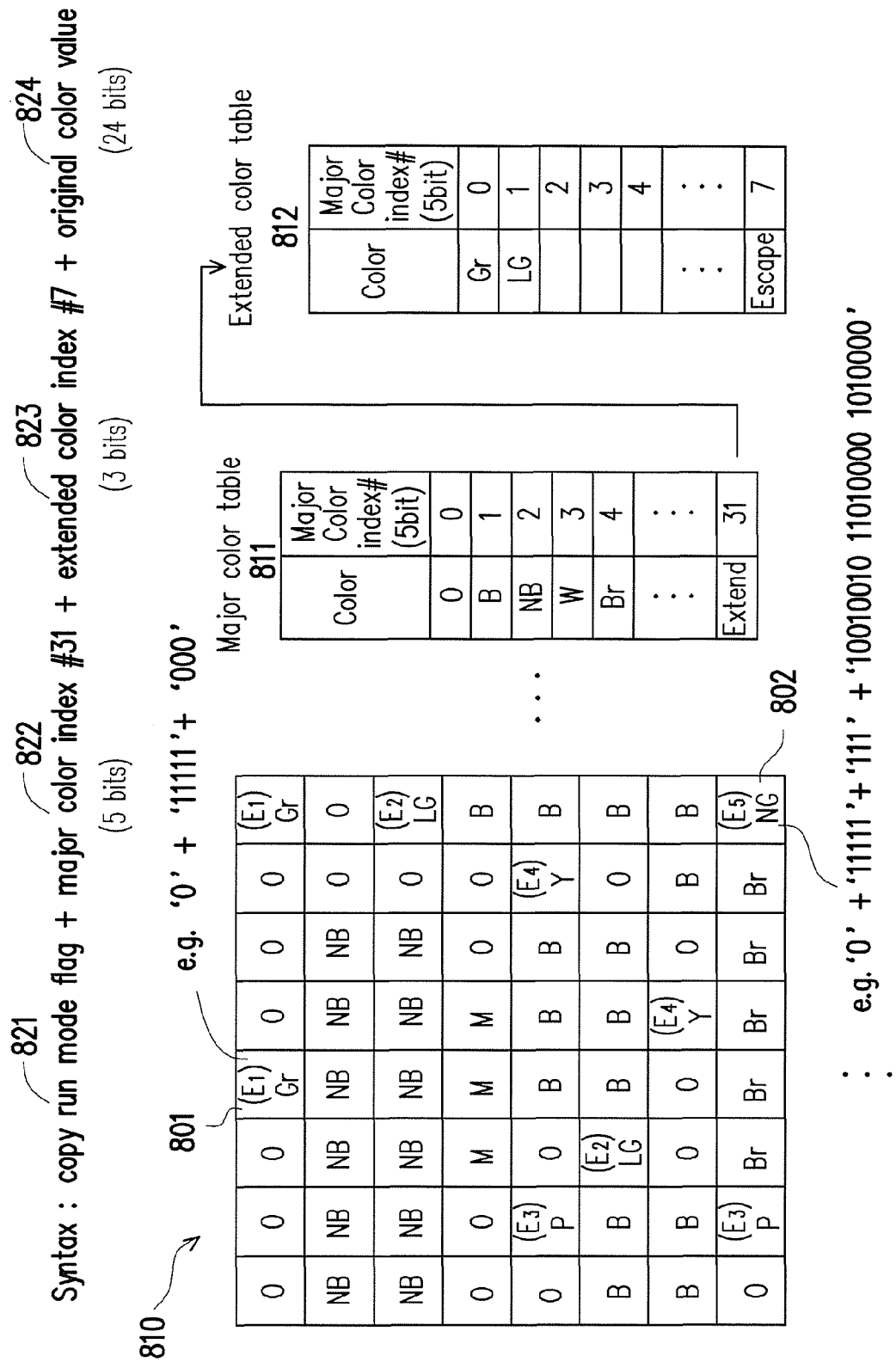
FIG. 8 illustrates a syntax of color palette coding in accordance with a second exemplary embodiments of the disclosure.

FIG. 8 illustrates a syntax of color palette coding as well as more details with regard to the extended color table and the handling of escape colors in accordance with a second exemplary embodiments of the disclosure. By applying the concept of FIG. 7 of splitting a comprehensive major color table, a major color table 811 and an extended color table 812 could be derived. For the example of FIG. 8, the major color table 811 has 32 entries while the extended color table has 8 entries. The major color table 811 would cover colors that occur most frequently from the coding block 810 and include colors such as orange (O), blue (B), navy blue (NB), white (W), brown (Br), and so forth which corresponds to indices 0, 1, 2, 3, 4, and so forth. One of the indices of the major color table 811 does not cover a particular color but actually refer to the extended color table 812. The index that refers to the extended color table 812 can be any index of the major color table 811. For the example of FIG. 8, the index that refers to the extended color table 812 is the last entry or index 31 of the major color table 811. In this way, when a encoding of a color from the extended color table 812 is required, the code would include the last index of the major color table 811 in order to refer to a color in the extended color table 812.

The extended color table 812 would include colors that do not appear as frequently in the coding block 810 as the colors from the major color table 811. For the example of FIG. 8, the extended color table 812 would include grey (Gr) that corresponds to index 0, light grey (LG) that corresponds to index 1, and so forth. The last entry of the extended color table does not refer to a particular color in the extended color table 812 but would actually refer to an escape color, which is neither a color from the major color table 811 nor a color from the extended color table 812. For a high resolution still image or a frame of a motion image, various escape colors may occur frequently.

By applying the major color table 811 and the extended color table 812, colors of each pixels from the coding block 810 could be encoded according to a specific syntax. For the second exemplary embodiment, the proposed syntax would include not limited to a copy run mode flag 821, a major color index 822, an extended color index 823, and optionally an original color value 824. As an example, the copy run mode flag 821 could be a one binary bit which indicates either a copy left run mode or a copy above run mode. The major color index 822 in the example of FIG. 8 would be a 5 bit binary sequence in order to fully cover 32 entries. The extended color index 823 in this example would be a 3 bit binary sequence covering 8 entries. If an escape color needed to be coded, the optional field of original color value 824 would be required such that when a decoder decodes upon the entry of escape color (e.g., last entry) of the extended color index 823, the decode may know that the code necessarily includes the element of an original color value 824.

For example, if a few consecutive row pixels having a color blue (B) needs to be encoded, the syntax may include the copy run mode flag 821 bit indicating copy left run mode as well as a binary sequence having a value that corresponds to index 1 of the major color table (e.g., 00001). For the pixel that has the color grey (Gr) 801 in the coding block, the syntax may include not limited to a run mode flag 821 indicating copy left or copy above, a major color index 822 of a value 31 pointing to an extended color, and an extended color index of 1, and thus the syntax could be not limited to '0'+'11111'+'000'. For the pixel 802 that has a rare color (e.g., neon green) not found in neither of the two tables, the syntax would contain a copy run mode flag 821 indicating copy left or copy above, a binary sequence indicating the last entry of the major color index 822, a binary sequence indicating the last entry of the extended color index 823, and a binary sequence indicating an original color value 824 which could be 24 bits as an example. Therefore, for the pixel 802, the syntax could be not limited to '0'+'11111'+ '111'+'10010010 11010000 1010000'.

Figure 9:
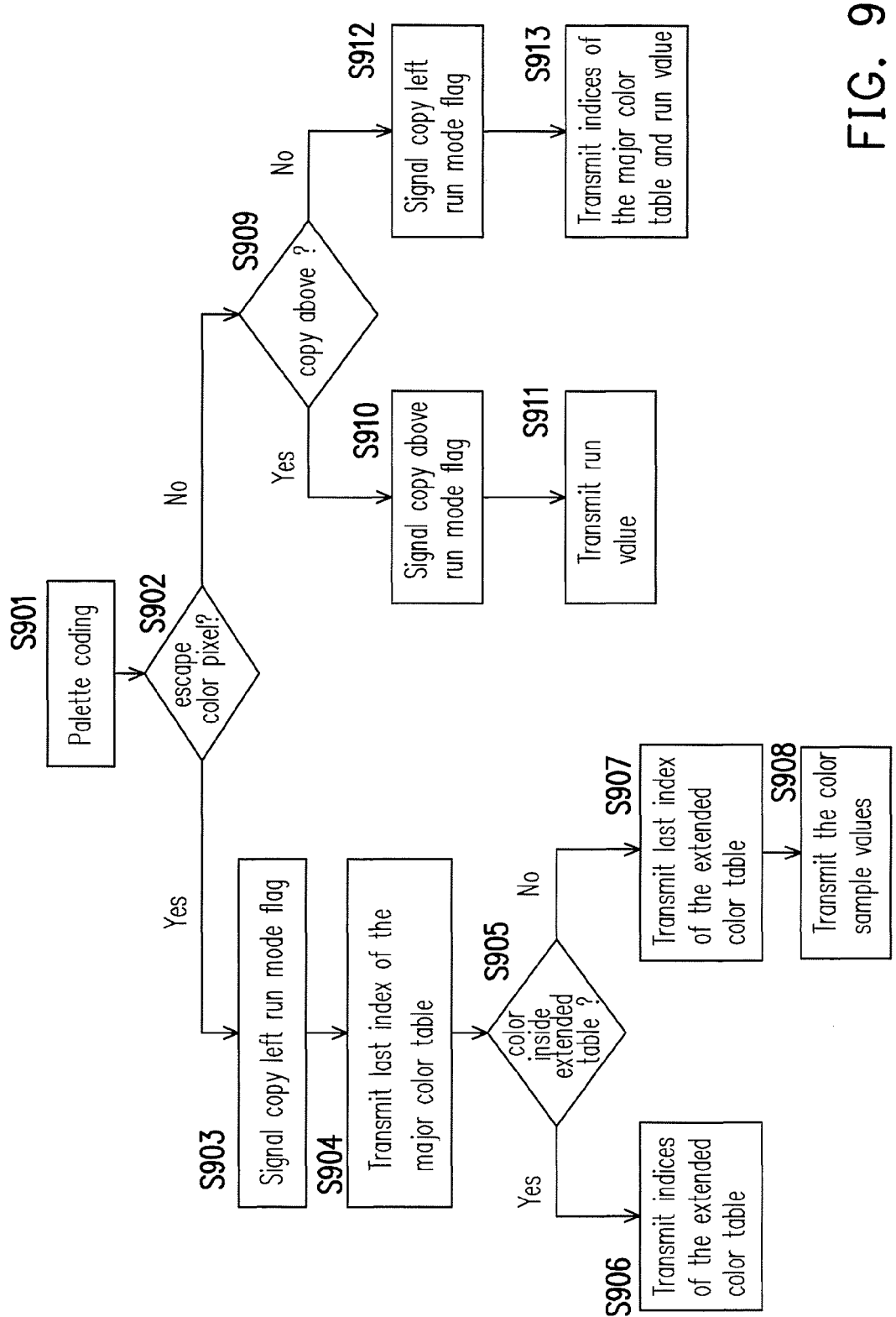
FIG. 9 illustrates a detailed flow chart of color palette coding in accordance with one of the exemplary embodiments of the disclosure.

FIG. 9 illustrates a detailed flow chart of color palette coding in accordance with the second exemplary embodiments of the disclosure. In step S901, an encoder (e.g., processor 501) of an electronic device has started to palette encode an image. In step S902, the encoder would determine whether a color of a pixel cannot be found in a (comprehensive) major color table. If a color of a pixel cannot be found in the major color table, then in step S903, the encoder would encode a run mode flag to be either copy left or copy above. In step S904, the encoder would encode the last entry of the major color table. In step S905, the encoder would determine whether color of the pixel corresponds to one of the entries of an extended color table. If that is the case then in step S906, the encoder would also encode the index of the extended color table that corresponds to the color. If in step S905, the encode has determined that the color of the pixel does not correspond to one of the entries of an extended color table, then in step S907, the encoder would encode the last entry of the extended color table. In step S908, the encoder encode the color according to an original color value (e.g., 24 bits) that corresponds to the color.

If in step S902 the encoder would determine whether a color of a pixel can be found in a (comprehensive) major color table, then in step S909 the encoder would determine whether the copy above mode is to be applied. If that is the case, then in step S910, the encoder would encode the copy run mode flag as copy above as well as encoding a run value associated with the copy run mode flag set as copy above. If in step S909, the encoder has determined that the copy left run mode is to be applied, then in step S912, the encoder would encode the copy run mode flag as copy left. In step S913, the encoder would encode the index of the major color table and a run value associated with the copy left run mode.

FIG. 10 illustrates implementing pixel level alternative escape flag in accordance with a third exemplary embodiment of the disclosure. The third exemplary embodiment is suitable to be used in a high QP or in a low bit rate coding condition in which escape color pixels seldom occur. In other words, the colors of pixels could all be found in a (comprehensive) major color table. Therefore, the disclosure proposes a pixel level alternative escape flag. If the flag signals, for example, a first value which represents activation by either 0 or 1, indices of the major color table would be used. However, the disclosure does not limit the pixel level alternative escape flag to 1 bit. If the flag signals a second value or inactive instead, then indices of the extended color table would be used. Referring to the example of FIG. 10, to encode a color grey (Gr) pixel in a coding block such as those labelled as 'E1', the pixel level alternative escape flag would be "on" (the first value) since the color grey corresponds to index 0 of the extended color table. Similarly, for encoding a pixel having a color light grey (LG) labelled as 'E2' in a coding block, the pixel level alternative escape flag would also be "on" (the first value). For encoding a pixel having a color neon green (NG) labelled as 'E5', the pixel level alternative escape flag would also be "on" (the first value) since neon green is not one of the colors in the extended color table.

As for the proposed syntax for encoding, a syntax may include not limited to a copy run mode flag, the proposed pixel level alternative escape flag, an extended color index, and optionally an original color value. For the particular example of FIG. 10, the copy run mode flag could be represented by at least one binary bit, the pixel level alternative escape flag can be represented by at least one binary bit, the extended color index could be represented by a binary bit sequence of 3 bits, the original color value can be represented by a binary bit sequence of 24 bits. In this way, the syntax for the pixel 1001 in the coding block may include not limited to a copy run mode flag set to copy left, a pixel level alternative escape flag set as 'on', and an extended color index which corresponds to index 0 of the extended color table. Therefore, the syntax for the pixel 1001, for example, could be '0'+'1'+'000'. As for the pixel 1002, the syntax would additionally require the original color value of the color escape color such as neon green as the extended color index would corresponds to the last index or index 7 of the extended color table. Therefore, the syntax for the pixel 1002, for example, could be '0'+'1'+'111'+ '10010010 11010000 1010000'.

Figure 11:
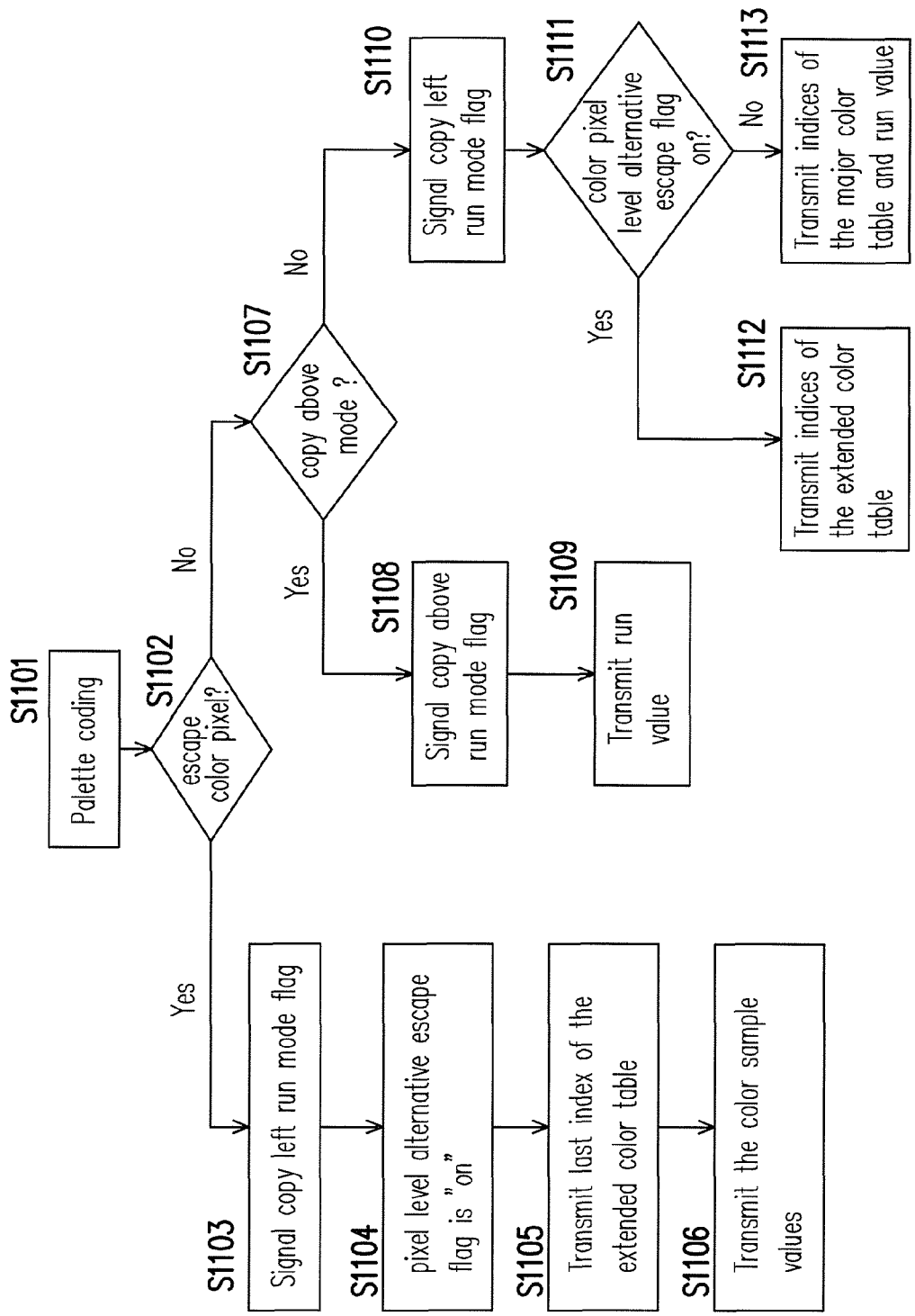
FIG. 11 illustrates a detailed flow chart of implementing pixel level alternative escape flag in accordance with one of the exemplary embodiments of the disclosure.

FIG. 11 illustrates a detailed flow chart of implementing pixel level alternative escape flag in accordance with one of the exemplary embodiments of the disclosure. In step S1101, an encoder (e.g., processor 501) of an electronic device has started to palette encode an image. In step S1102, the encoder would determine whether a color of a pixel cannot be found in a (comprehensive) major color table but also cannot be found in an extended color table. In other words, the pixel in this example would have an escape color. Since that is the case, then in step S1103, the encoder would encode a run mode flag to be either copy left. In step S1104, the encoder would encode the pixel level alternative escape flag as 'on' which could be represented by a binary bit value of either 0 or 1. In step S1105, the encoder would encode the last index of an extended color table. If that is the case then in step S1106, the encoder would also encode the original color value of the escape color. If in step S1102, the encoder has determined that the color of the pixel cannot be found in a (comprehensive) major color table but can instead be found in an extended color table, then encoder would determine whether to encode copy above mode. If copy above mode is to be encoded, then in step S1108, the encoder would set the copy run mode flag as copy above. In step S1108, the encoder would set a run value associated with the copy above mode. If in step S1101 the encoder has determined that the copy left mode is to be encoded, then in step S1110, the encoder would set the copy run mode flag as copy left. In step S1111, the encoder would need to determine whether to set the pixel level alternative escape flag as 'on'. If that is the case, then in step S1112, the encoder would encode the index of the extended color table which corresponds to one of the colors that matches the color of the pixel to be encoded. If in step S1111, the encoder has determined to set the pixel level alternative escape flag as 'off', then in step S1113, the encoder would encode the index of the major color table which corresponds to one of the colors that matches the color of the pixel to be encoded. Step S1113 would signify that the color to be encoded can be found in a major color table.

Figure 12A:
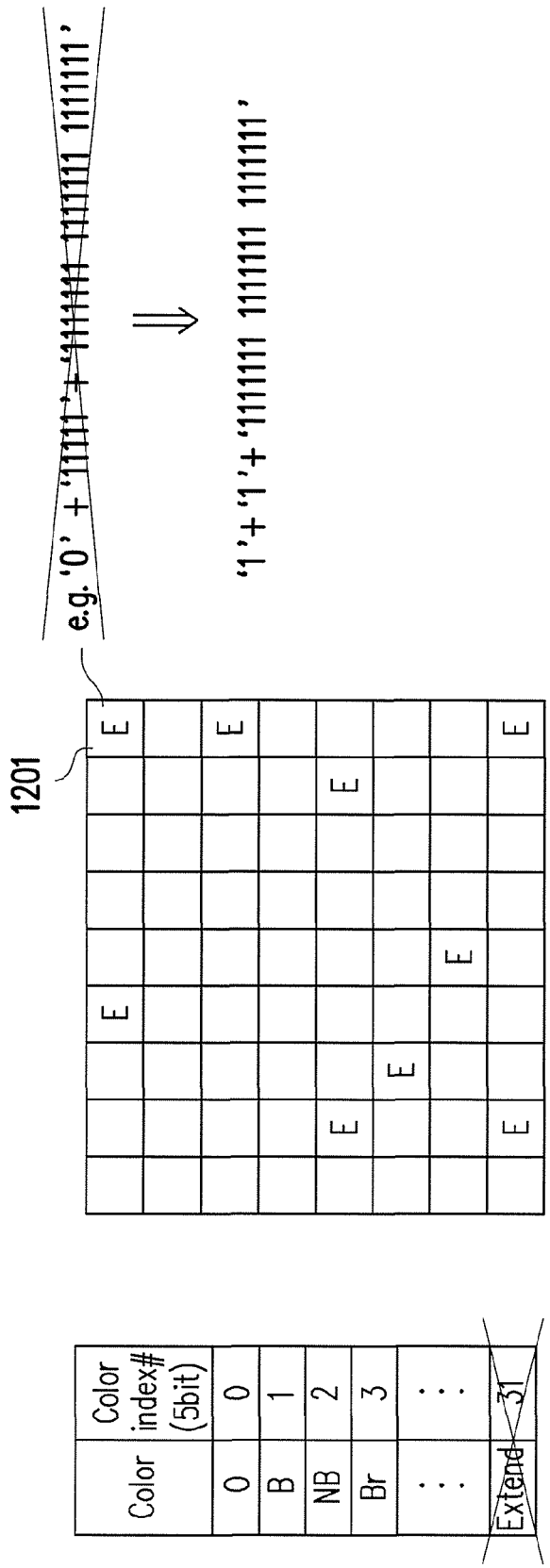
FIG. 12A illustrates an alternative embodiment of operating with pixel level alternative escape flag in accordance with a fourth exemplary embodiment of the disclosure.

FIG. 12A illustrates an alternative embodiment of operating with pixel level alternative escape flag in accordance with a fourth exemplary embodiment of the disclosure. For this exemplary embodiment, the signaling of the escape color pixel would be moved from the copy left mode to copy above mode only when a pixel to be encoded is an escape color. A pixel level alternative escape flag is used to indicate whether a pixel is an escape color or in a copy above mode. If the color to be encoded is an escape color, then the syntax would include not limited to a copy above run mode flag+pixel level alternative flag (e.g., set as "1")+original color value for the escape color. If the color to be encoded is not an escape color, then the syntax would include not limited to a copy above run mode flag+a pixel level alternative escape flag (e.g., set as "0")+a run value associated with the copy above mode.

Referring to FIG. 12A, for pixel 1201 which is an escape color, conventionally this pixel would be encoded by a syntax that includes a copy run mode flag represented by at least one bit, a bit stream representing the last entry of a major color table, and a bit stream representing the original color value of the escape color (e.g., '0'+'11111'+'11111111 1111111 1111111'). However, for the fourth exemplary embodiment, the syntax would include a copy run mode flag represented by at least one bit, a pixel level alternative escape flag which is most likely one bit instead of a bit stream, and a bit stream representing the original color value of the escape color (e.g., '1'+'1'+'11111111 1111111 1111111'). In this way, overheads can be reduced since using the pixel level alternative escape flag requires less number of bits than the bit stream representing the last entry of a major color table.

FIG. 12B illustrates an example of operating with pixel level alternative escape flag in accordance with a fourth exemplary embodiment of the disclosure. For this example, the conventional copy above mode run flag could be replaced by adding a flag after the run mode flag to indicate which color table is used (e.g., '1'+'0'+'0'). This proposed flag can be represented in a conventional way (e.g., fixed length binary representation) or by variable length coding to address the frequency or the importance of the color tables. For example, colors inside the major color table may occur more frequently than colors in the extended color tables or escape colors. Therefore, the proposed flag could be coded by Huffman code, exponential-Golomb code, or Golomb-Rice coding methods. Referring to the colors represented in the extended color tables, a pixel could be encoded by a syntax that includes a copy run mode flag represented by at least one bit, a bit stream to indicate what extended color table is referred to, and a bit stream representing the original color value of the escape color. For example, the pixel 1211 could be represented at least by '1'+'10'+'000'. When encoding an escape color, an encoded syntax could include a copy run mode flag represented by at least one bit, a bit stream representing which extended color table are indicated, and a bit stream representing the original color value of the escape color. For example, the pixel 1212 could be represented at least by '1'+'11'+'11111111 1111111 1111111'.

If the decoder that decodes the above bit stream parses the syntax and determine that this is copy above run mode, the decoder will then decode the flag. As mentioned in the example above, the decoded flag is '0', and thus the decoder decode the following syntax as copy above run value. If the decoded flag is '10', the decoder decodes the next stream as the indices of the extended color table. Otherwise, if the decoded flag is '11', it indicates that the decoder need to decode escape values.

Figure 13:
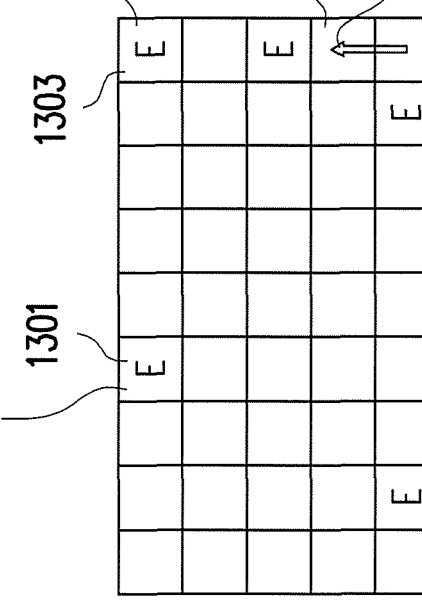
FIG. 13 illustrates representing escape colors in alternative manners in accordance with a fifth exemplary embodiment of the disclosure.

FIG. 13 illustrates representing escape colors in alternative manners in accordance with a fifth exemplary embodiment of the disclosure. The fifth exemplary embodiment is suitable to be used under the circumstance when the copy-above mode with run value zero very rarely occurs. Therefore, it is proposed that the signaling for escape color encoding is moved from the copy left run mode in a conventional to the copy above run mode in the proposed design. The encoding for an escape color would be similar to the third exemplary embodiment as the syntax for an escape color would include not limited to at least one bit representing the copy mode run flag which is set as copy above mode+one bit representing a run value associated with the copy above mode but set as '0'+a bit stream representing an original color value of the escape color to be encoded. The copy above run value would start from 1, and the conventional copy above mode+a run value "0" would be replaced by the copy run mode flag set as copy left along with the palette index simplification of the third exemplary embodiment without the pixel level alternative escape flag.

Referring to the examples of FIG. 13 which may require only a major color table 1304 without other tables as the last index of the major color table 1304 refers to a specific color rather than another set of table. Assuming that the pixel 1301 and the pixel 1303 are escape colors and are identical, the syntax would include not limited to a copy run mode flag set as copy above, a one bit run value which could be set as zero, and an original color value of the escape color. Therefore, the syntax could be, for example, '1'+'0'+'1111111 1111111 1111111'. For the pixel 1302 which is the same color as the pixel below, the syntax may only include a one bit a run mode flag set as copy above and a one bit run value associated with the copy above mode.

Figure 14:
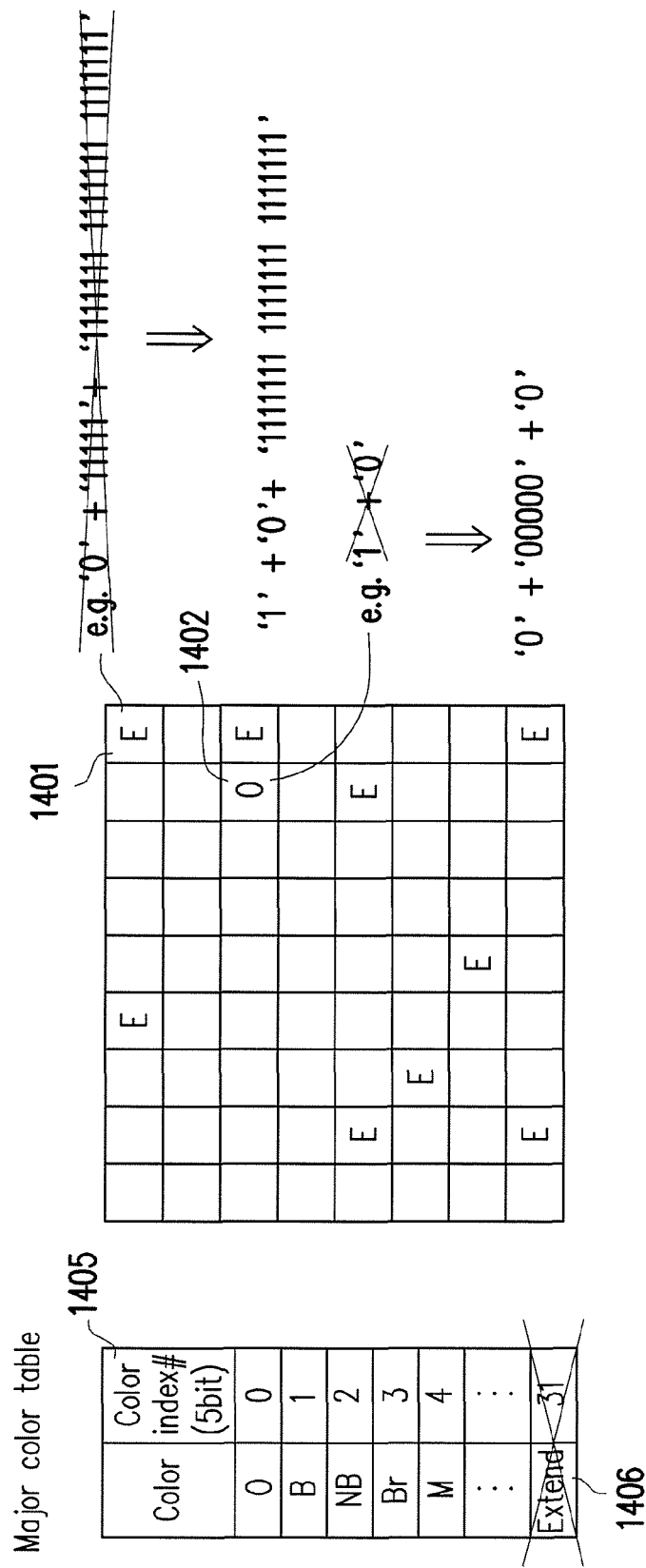
FIG. 14 illustrates an example of the fifth exemplary embodiment of the disclosure.

FIG. 14 illustrates an example of the fifth exemplary embodiment of the disclosure. For the major color table 1406, the last index 1406 for an escape is not required. For pixel 1401 which is an escape color, the syntax for a conventional coding system could be a copy run mode flag+the last index of the major color table+an original color value of the escape color (e.g., '0'+'11111'+'1111111 1111111 1111111'). However, the proposed syntax as disclosed above could be not limited to a copy run mode flag set as copy above, a one bit run value which could be set as zero, and an original color value of the escape color, and thus the syntax could be, for example, '1'+'0'+'1111111 1111111 1111111'. As for the pixel 1402 which is orange color corresponding to index 0 of the major color table 1405, the pixel would be encoded by an one bit a run mode flag set as copy above and an one bit run value associated with the copy above mode and an index corresponding to the color orange in the major color table 1405; thus, the syntax could be, for example, '1'+'00000'+'0'.

As for a sixth exemplary embodiment, it is suitable to be used when escape color pixels very rarely occur such as in high QP or low bit rate coding condition in which escape color pixels rarely occur. Therefore, a coding unit level alternative escape flag is proposed. When the coding unit level alternative escape flag is set as inactive, then a conventional coding scheme would be used. This means that the last index in a comprehensive major color table would refer to an escape color, as identical to a current SCM software. Only when the coding unit level alternative escape flag is set as active, any of the embodiments of the proposed methods color palette coding would be used.

Figure 15:
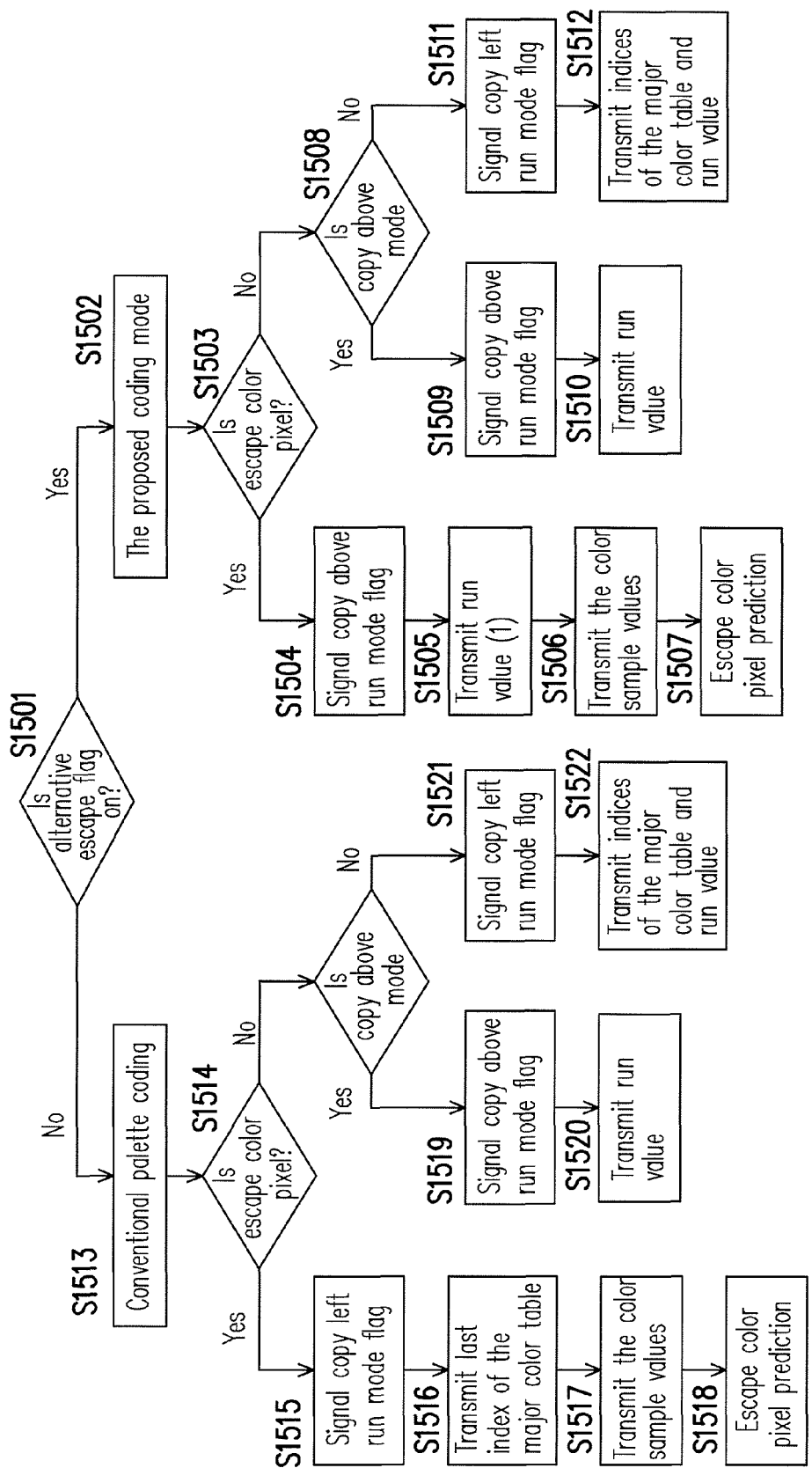
FIG. 15 is a comprehensive flow chart illustrating the procedures of the fourth, fifth, and sixth exemplary embodiment of the disclosure.

FIG. 15 is a comprehensive flow chart illustrating the procedures of the fourth, fifth, and sixth exemplary embodiment of the disclosure. In step S1501, an encoder (e.g., processor) may determine whether a coding unit level alternative escape color flag to be set as active. If the conventional palette coding mechanism is to be used, then the coding unit level alternative escape color flag would be set as inactive. In that case, steps S1515~S1522 would be executed. Since the mechanisms of steps S1515~S1522 are conventional and are self-explanatory in the drawing, a repetition of the written descriptions is not necessary. If the proposed method of color palette coding and any of their exemplary embodiments is to be used as stated in step S1502, then the coding unit level alternative escape color flag would be set as active in step S1501.

In step S1503, the encoder would determine whether the color of a pixel to be encoded is an escape color. If the color of the pixel to be encoded is an escape color, then in step S1504, the encoder would encode a copy run mode flag set as copy above. In step S1505, the encoder would encode a run value associated with the copy above copy run mode flag. In step S1506, the encoder may encode an original color value of the escape color. In step S1507, the encoder may perform an escape color pixel prediction which will be described in the eighth exemplary embodiment.

If the color of the pixel to be encoded is not an escape color back in step S1503, then in step S1508, the encoder would determine whether copy above mode would be set for the copy run mode flag. If the copy run mode flag is to be set as copy above, then in step S1509, the encoder would set the copy run mode flag as copy above. In step S1510, the encoder would encode a run value associated with the copy above copy run mode flag. If in step the encoder has determined that copy left mode would be set for the copy run mode flag, then in step S1511, the encoder would set the copy left mode for the copy run mode flag. In step S1512, the encoder would transmit an index of a major color table and a run value associated with the color to be encoded.

Figure 16:
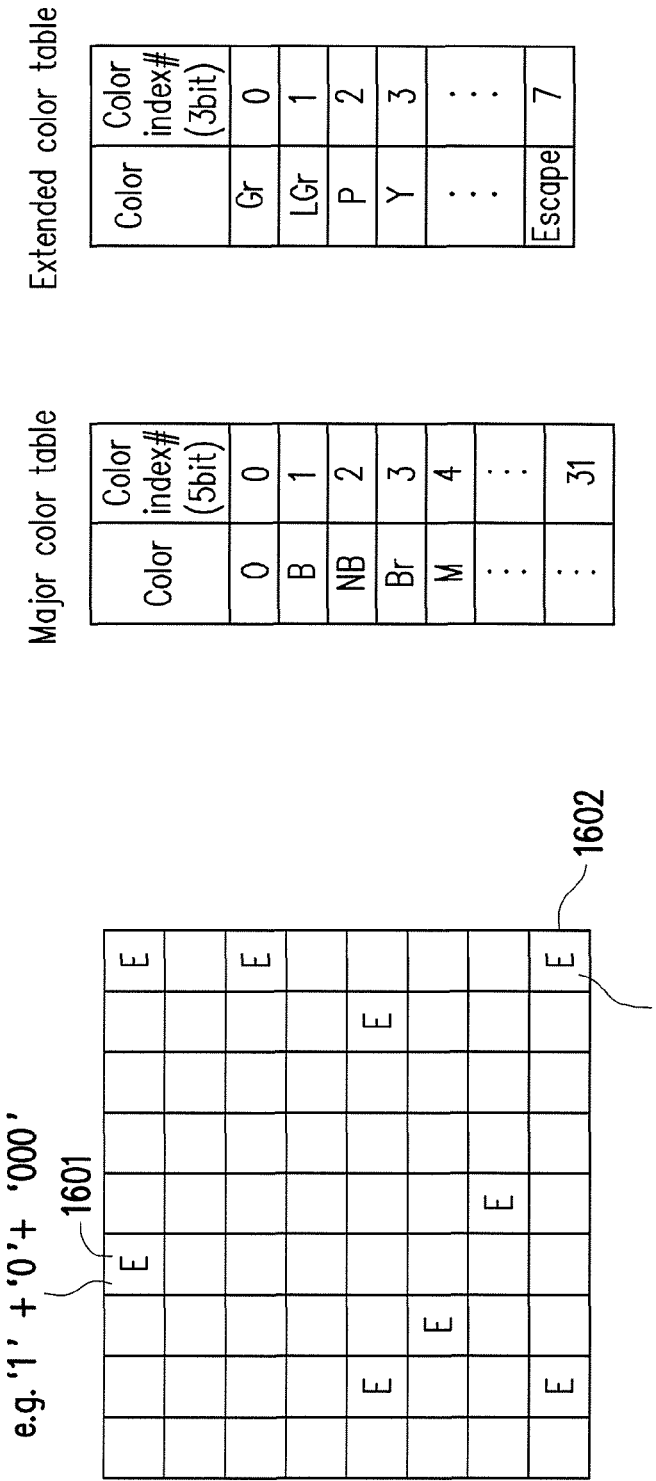
FIG. 16 illustrates using a combination of an extended color table with an alternative implementation of representing escape colors in accordance with the seventh exemplary embodiment of the disclosure.

FIG. 16 illustrates using a combination of an extended color table with an alternative implementation of representing escape colors in accordance with the seventh exemplary embodiment of the disclosure. The seventh exemplary embodiment is premise upon the second and fifth exemplary embodiment by combining an extended color table with an alternative escape color pixel flag in order to represent an escape color. The syntax of the seventh exemplary embodiment to represent an escape color would include not limited to an one bit copy run mode flag set as copy above, an one bit run value associated with the copy above mode, a binary sequence (e.g., 3 bits) which represents the last index of the extended color table, and a binary sequence (e.g., 24 bits) that includes the original color value of the escape color to be represented. By following the rule of the syntax above, assuming that the pixel 1601 is the color grey (Gr) which corresponds to index 0 (e.g., 000) of the extended color table, the syntax for the pixel 1601 could be '1'+'0'+'000'. For the pixel 1602 which is an escape color not covered by the major color table nor the extended color table, the syntax could be '1'+'0'+'111'+'10010010 1101000 1010000'.

Figure 17:
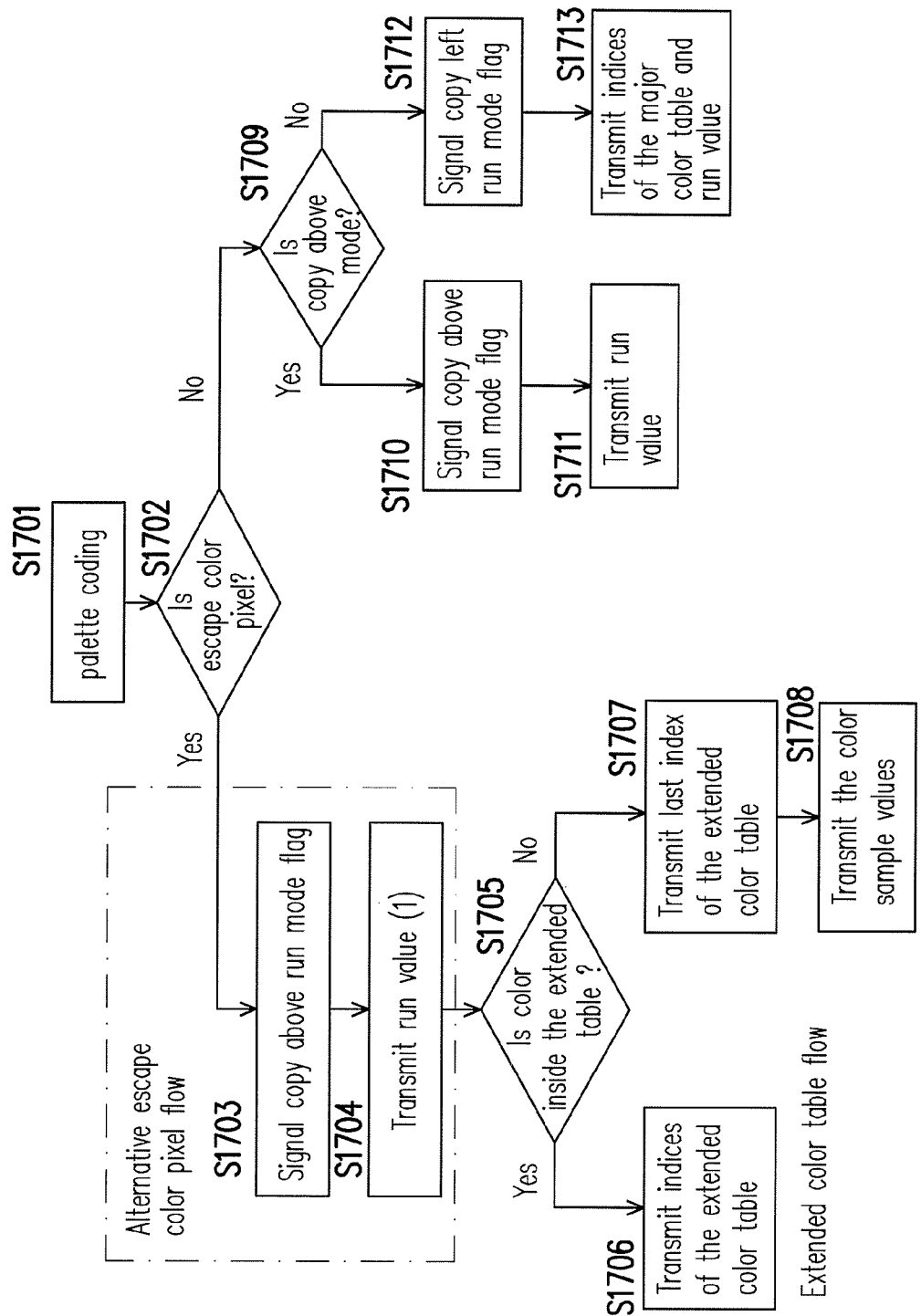
FIG. 17 is a flow chart which illustrates the procedure of the seventh exemplary embodiment of the disclosure.

FIG. 17 is a flow chart which illustrates the procedure of the seventh exemplary embodiment of the disclosure. In step S1701, the encoder commences the proposed method of color palette encoding. In step S1702, the encoder would determine whether a color to be encoded does not appear in a (comprehensive) major color table. In step S1703, the encoder would encode the copy run mode flag set as copy above mode and a run value associated with the copy above mode as shown in step S1704. In step S1705, the encoder would determine whether the color to be encoded is inside of an extended color table. If the color is inside of an extended color table, then in step S1706, the encoder would transmit an index of the extended color table. If the color is not inside of an extended color table, then in step S1707, the encoder would transmit the last index of the extended color table. In step s 1708, the encoder would transmit an original color value of the escape color to be encoded.

If in step S1702 the encoded has determined that the color of the pixel to be encoded in found in a (comprehensive) major color table, then in step S1709, the encoder would determine whether the copy run mode flag would be set as copy above. If the copy run mode flag would be set as copy above mode, the in step S1710, the encoder would encode the copy run mode flag which is set as copy above mode. In step S1711, the encoder would encode a run value associated with the copy above mode. If the copy run mode flag is determined to be set as copy left mode, then in step S1712, the encoder would encode the copy run mode flag which is set as copy left mode. In step S1713, the encoder would encode the index of a major color table as well as a run value associated with the copy left mode.

Figure 18:
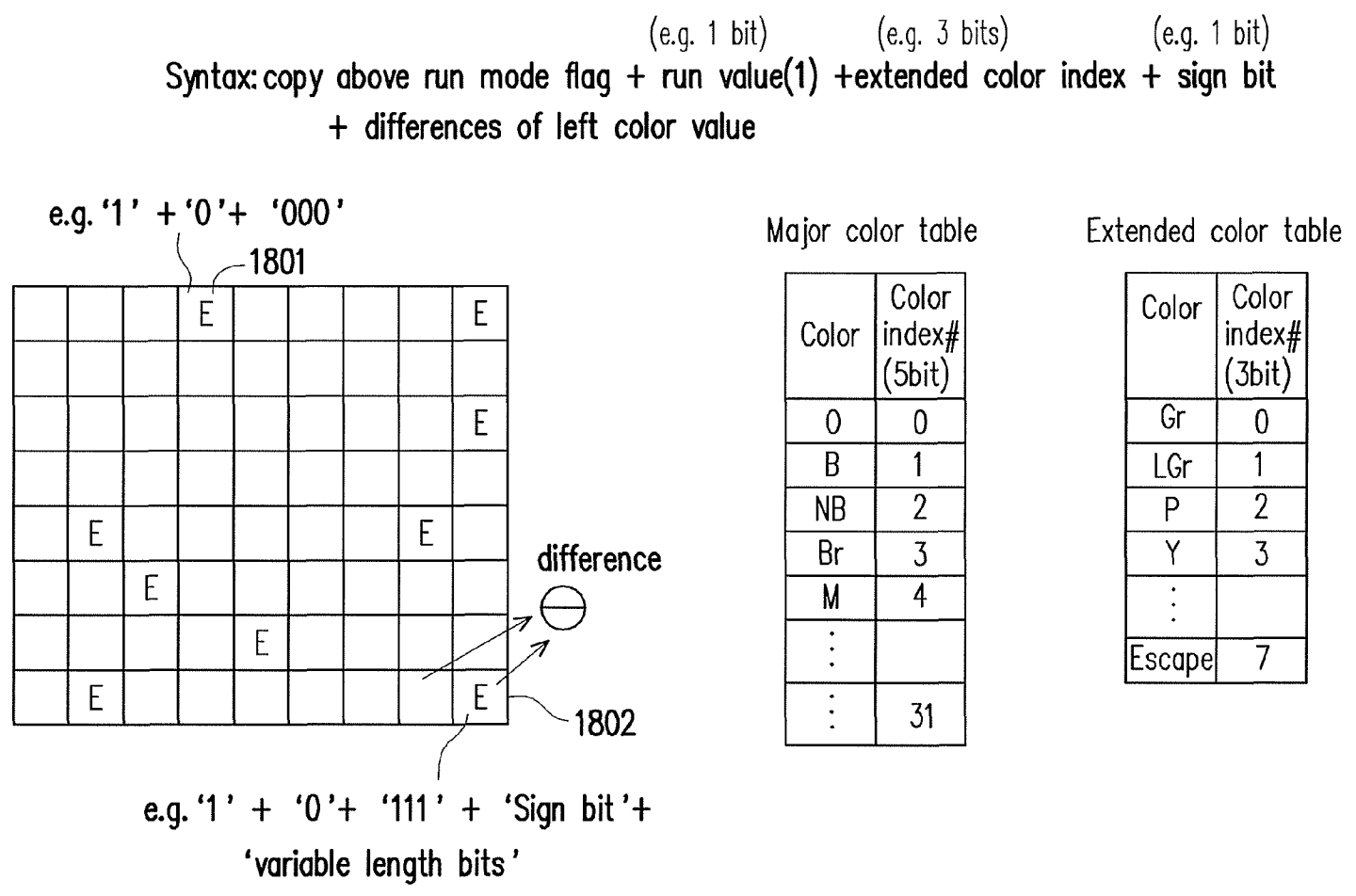

FIG. 18 illustrates escape color pixel prediction in accordance with the eighth exemplary embodiment of the disclosure. The eighth exemplary embodiment would involve representing an escape color of a pixel by referencing a neighboring pixel and encoding a difference of colors between the pixel having the escaping color and the neighboring pixel. To generate major color table in a lossless coding scheme, it requires three components of color samples to be identical in order to group them together. Since many color samples could just be slightly different from major colors, neighboring pixel or the last coded escape color pixels could be referenced to represent an escape color. Predictors could be used to predict the current escape color pixel. A coding syntax may include the differences as well as a sigh bit between two neighboring pixels.

To referring to the example of FIG. 18, a syntax to represent a color may include not limited to an one bit a copy run mode flag+an one bit run value associated with the copy run mode flag, an index of an extended color table (e.g., 3 bits), an one bit signed bit, and a difference color value which can have a variable bit value. For example, the color of the pixel 1801 is grey which corresponds to index 0 of the extended color table. Therefore, the syntax would include not limited to the copy run mode flag+run value associated with the copy run mode flag+extended color index which is '1'+'0'+'000'. For the pixel 1802, since it is an escape color not covered by the extended color table, the syntax would include a copy above run mode flag+run value of the copy above mode+last index of the extended color table+signed bit+variable length bits which is the difference between the escape color and the color of a neighboring color such as the color of the pixel on the left of the pixel 1802. Therefore, the syntax could be '1'+'0'+'111'+'signed bit'+'variable length bits'.

Figure 19:
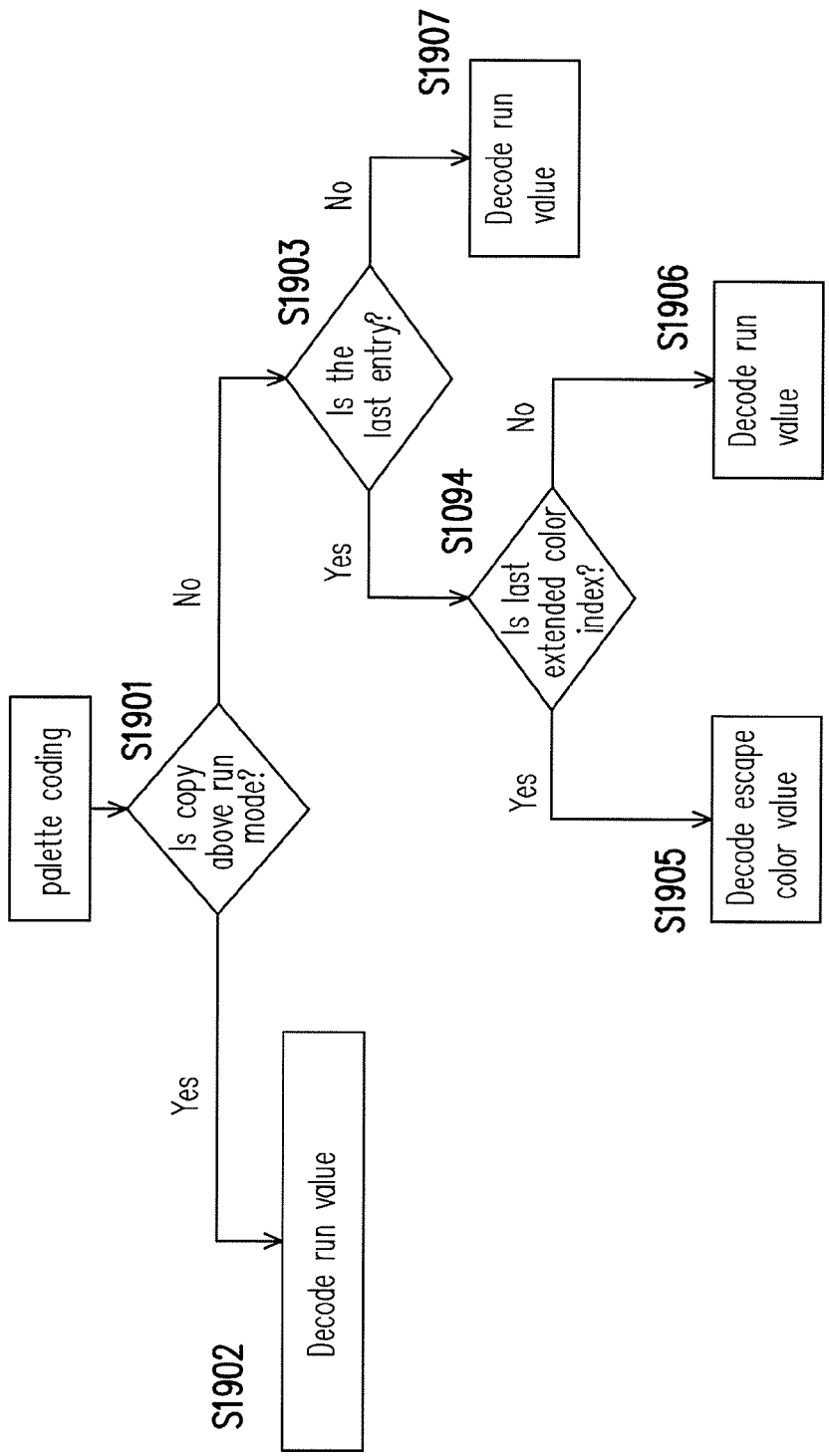
FIG. 19 illustrates a decoding process of a coded syntax in accordance with one of the exemplary embodiments of the disclosure.

FIG. 19 illustrates a decoding process of a coded syntax in accordance with one of the exemplary embodiments of the disclosure. In step S1901, when a decoder receiving a syntax such as the one shown in the FIG. 8 for example, the decoder would decode the copy run mode flag 821 at first. If the copy run mode flag 821 is decoded to be a first value such as ("on", or "1"), it indicates that the copy run mode is the copy above run mode. Otherwise, if a second value is decoded, the copy run mode flag 821 would indicate that it is copy left run mode. If the flag 821 indicates copy run above run mode, the in step S1902, the decoder would decode a next syntax or a following bit stream for run value. The decoder would then copy numbers of the indices above the current position according to the run value. Otherwise, if the flag 821 is decoded as a second value such as 'off' or zero, in step S1903 the decoder will then decode the next syntax to determine the major color index. If the number of the decoded indices of the major color index is the last entry, as shown as 822, then in step S1904 the decoder would continue to decode the next syntax for the extended color index. If the extended color index is determined to be the last index of the extended color table, then in step S1905 the decoder would the following syntax as escape values; otherwise in step S1906 the decode would then decode the run value. If in step S1903 the index of the major color index table is not the last entry, then the decoder would decode the run value.

In view of the aforementioned descriptions, the present disclosure is suitable for being used by any electronic device which performs image compression that results in a reduction of the amount of bits required to represent an image by as much as 1%.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of color palette for implementing a binary representation of a color applicable to an electronic device, the method comprising:
providing, by using a non-transitory computer readable storage medium, a digital image including a coding unit;
encoding, by using a processor, a bit stream of the digital image to represent a single color of the coding unit, wherein the bit stream comprises:
a binary bit representing a run flag;
a N binary bit sequence with each of the possible values of the N binary bit sequence representing an unique major color index of $2^N$ major color indices, wherein the $2^N$ major color indices comprises $2^N-1$ major color indices referring to $2^N-1$ major colors and an index referring to $2^M-1$ extended colors; and a M binary bit sequence with each of the possible values of the M binary bit sequence representing an unique extended color index of $2^M$ extended color indices, wherein the $2^M$ extended color indices comprises $2^M-1$ extended color indices referring to the $2^M-1$ extended colors and an index referring to an escape color or a second set of extended colors, wherein the $2^M-1$ extended colors are not the major colors and appears less frequently than the major colors in the coding unit; and storing the bit stream in the storage medium to be decoded and displayed or transmitting the bit stream to a video driver to be decoded and displayed.

2. The method of claim 1, wherein one of the $2^M$ extended color indices refers to the escape color which is neither one of the major colors nor one of the extended colors.

3. The method of claim 1, wherein the bit stream further comprises an escape color bit sequence representing the escape color.

4. The method of claim 3, wherein the escape color bit sequence is longer than the N binary bit sequence, is longer than the M binary bit sequence, and represents the color according to an original color value of the escape color.

5. The method of claim 1, wherein the last of the $2^N$ major color indices refers to the extended colors.

6. The method of claim 2, wherein the last of the $2^M$ extended color indices refers to the escape color.

7. The method of claim 1, wherein one of the $2^M$ extended color indices refers to the second set of extended colors which are neither the major colors nor the extended colors.

8. The method of claim 1, wherein two of the unique major color indices of the $2^N$ major color indices are represented by different binary sequence lengths.

9. The method of claim 1 further comprising:
decoding, by using the first or a second processor, the bit stream to obtain the color of the coding unit, wherein the bit stream is decoded to obtain at least:
a first run flag represented by the binary bit;
a first major color index represented by the N binary bit sequence; and
a first extended color index represented by the M binary bit sequence.

10. The method of claim 9 further comprising:
obtaining the first extended color index based on the first major color index;
obtaining the color based on the first extended color index if the color is not an escape color; and
obtaining the color based on the first extended color index which is the last index of the extended color indices if the color is an escape color.

11. An electronic device comprising:
a non-transitory computer readable storage medium configured for providing a digital image including a coding unit; and
a processor coupled to the storage medium and is configured at least for:
encoding a bit stream of the digital image to represent a single color of the coding unit, wherein the bit stream comprises:
a binary bit representing a run flag;
a N binary bit sequence with each of the possible values of the N binary bit sequence representing an unique major color index of $2^N$ major color indices, wherein the $2^N$ major color indices comprises $2^N-1$ major color indices referring to $2^N-1$ major colors and an index referring to $2^M-1$ extended colors; and
a M binary bit sequence with each of the possible values of the M binary bit sequence representing an unique extended color index of $2^M$ extended color indices, wherein the $2^M$ extended color indices comprises $2^M-1$ extended color indices referring to the $2^M-1$ extended colors and an index referring to an escape color or a second set of extended colors, wherein the $2^M-1$ extended colors are not the major colors and appears less frequently than the major colors in the coding unit; and
storing the bit stream in the storage medium to be decoded and displayed or transmitting the bit stream to a video driver to be decoded and displayed.

12. A method of color palette for representing a color applicable to an electronic device comprising a non-transitory computer readable storage medium and a processor coupled to the storage medium, the method comprising:
retrieving, by the processor, a bit stream from the storage medium; and
decoding, by the processor, a color based on the bit stream according to at least:
decoding, from the bit stream, a N binary bit sequence to obtain a major color index which indicates an index referring to one of $2^N$ major color indices comprising $2^N-1$ major color indices referring to $2^N-1$ major colors and an index referring to $2^M-1$ extended colors;
decoding, from the bit stream, a M binary bit sequence to obtain an extended color index based on the major color index, wherein the extended color index indicates an index referring to one of $2^M-1$ extended colors or an index referring to an escape color;
decoding the color based on the extended color index if the color is not the escape color; and
decoding the color based on the extended color index which is a last index of the extended color indices if the color is the escape color.

13. The method of claim 12, wherein if the color is the escape color, claim 12 further comprising:
decoding from the bit stream an escape color bit sequence based on an original color value of the escape color.

* * * * *